United States Patent
Mizuno et al.

(10) Patent No.: US 10,362,147 B2
(45) Date of Patent: Jul. 23, 2019

(54) NETWORK SYSTEM AND COMMUNICATION CONTROL METHOD USING CALCULATED COMMUNICATION INTERVALS

(71) Applicant: Seiko Epson Corporation, Tokyo (JP)

(72) Inventors: Morimichi Mizuno, Azumino (JP); Takayuki Yamamoto, Matsumoto (JP); Akio Takamoto, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 250 days.

(21) Appl. No.: 15/284,742

(22) Filed: Oct. 4, 2016

(65) Prior Publication Data

US 2017/0104849 A1    Apr. 13, 2017

(30) Foreign Application Priority Data

Oct. 9, 2015  (JP) ................................ 2015-201204
Oct. 9, 2015  (JP) ................................ 2015-201214
Nov. 9, 2015  (JP) ................................ 2015-219620

(51) Int. Cl.
*H04L 29/06*    (2006.01)
*H04N 1/00*    (2006.01)
(Continued)

(52) U.S. Cl.
CPC ............ *H04L 67/42* (2013.01); *H04L 43/065* (2013.01); *H04L 43/16* (2013.01); *H04L 67/325* (2013.01);
(Continued)

(58) Field of Classification Search
CPC ....... H04L 67/42; H04L 67/325; H04L 69/28; H04L 43/16; H04L 43/065; H04L 67/025;
(Continued)

(56) References Cited

U.S. PATENT DOCUMENTS

2002/0059436 A1  5/2002  Kubo
2008/0170584 A1*  7/2008  Shoji ...................... H04L 43/10
                                                                  370/449
(Continued)

FOREIGN PATENT DOCUMENTS

EP   2 381 643 A1   10/2011
JP   06-318893 A    11/1994
(Continued)

OTHER PUBLICATIONS

Partial European Search Report dated Jan. 13, 2017 in related European Appl. 16192409.7 (8 pgs.).

(Continued)

*Primary Examiner* — Abdulkader M Alriyashi
(74) *Attorney, Agent, or Firm* — Foley & Lardner LLP

(57) ABSTRACT

Increasing the processing load on the server is suppressed in a network system in which response requests are intermittently transmitted from a client to a server. A network system has a client configured to transmit response requests at a specific time interval, and a server configured to send a response to the client according to a received response request. The server calculates a communication interval indicating an interval at which the client is to transmit its response request based on a factor affecting the processing load of the server, and sends communication interval information indicating the calculated communication interval to the client. The client transmits its response request at the time interval indicated by the communication interval information received from the server.

10 Claims, 26 Drawing Sheets

(51) Int. Cl.
*H04L 12/26* (2006.01)
*H04L 29/08* (2006.01)

(52) U.S. Cl.
CPC ......... *H04L 69/28* (2013.01); *H04N 1/00344* (2013.01); *H04L 67/025* (2013.01); *H04N 2201/0039* (2013.01); *H04N 2201/0043* (2013.01); *H04N 2201/0094* (2013.01)

(58) Field of Classification Search
CPC ....... H04N 1/00344; H04N 2201/0094; H04N 2201/0039; H04N 2201/0043
See application file for complete search history.

(56) References Cited

U.S. PATENT DOCUMENTS

| | | | | |
|---|---|---|---|---|
| 2009/0303534 | A1* | 12/2009 | Gotoh | G03G 15/5075 358/1.15 |
| 2011/0264778 | A1* | 10/2011 | McGregor | G06F 9/5016 709/223 |
| 2012/0081749 | A1 | 4/2012 | Kitada | |
| 2012/0124431 | A1 | 5/2012 | Bauer et al. | |
| 2013/0054818 | A1* | 2/2013 | Furuta | H04L 67/145 709/227 |
| 2013/0258384 | A1 | 10/2013 | Kanoh | |
| 2013/0297811 | A1 | 11/2013 | Park et al. | |
| 2014/0201343 | A1 | 7/2014 | Keskkula | |
| 2015/0317104 | A1* | 11/2015 | Takenouchi | G06F 3/1207 358/1.15 |
| 2016/0381651 | A1* | 12/2016 | Swinkels | H04J 3/0638 370/350 |

FOREIGN PATENT DOCUMENTS

| | | | |
|---|---|---|---|
| JP | 2000-138920 | A | 5/2000 |
| JP | 2002-149519 | A | 5/2002 |
| JP | 2004-005669 | A | 1/2004 |
| JP | 2004-265096 | A | 9/2004 |
| JP | 2005-242564 | A | 9/2005 |
| JP | 2006-285374 | A | 10/2006 |
| JP | 2009-048230 | A | 3/2009 |
| JP | 2010-049364 | A | 3/2010 |
| JP | 2013051521 | A * | 3/2013 |
| JP | 2013-137642 | A | 7/2013 |
| JP | 2013-205968 | A | 10/2013 |
| JP | 2014-085800 | A | 5/2014 |
| JP | 2015-118413 | A | 6/2015 |

OTHER PUBLICATIONS

Extended European Search Report dated Feb. 21, 2017 in related European Appl. 16192409.7 (11 pgs.).

* cited by examiner

211

| PRINT ID | PRINTER ERROR | PRINTHEAD ERROR | CUTTER ERROR |
|---|---|---|---|
| A0001 | YES | NO | NO |
| A0002 | NO | YES | NO |
| A0003 | NO | NO | YES |
| A0004 | YES | NO | NO |
| ... | | | |

FIG. 8

NETWORK SYSTEM AND COMMUNICATION CONTROL METHOD USING CALCULATED COMMUNICATION INTERVALS

This application claims priority under 35 U.S.C. § 119 to Japanese Patent Application No. 2015-201204 filed on Oct. 9, 2015, No. 2015-201214 filed on Oct. 9, 2015, and No. 2015-219620 filed on Nov. 9, 2015, the entire disclosure of which is expressly incorporated by reference herein.

BACKGROUND

1. Technical Field

The present invention relates to a network system, client, and communication control method.

2. Related Art

Network systems that have clients and multiple servers connected over a network, and reduce the processing load on the servers by distributing access from clients to different servers are known from the literature. See, for example, JP-A-2004-5669.

Some network systems having clients and servers connected over a network are also configured to communicate by having a client send a response request to a server, and having the server respond to the response request. If in this type of network system, a client is configured to send response requests to a server at specific (or regular) time intervals, this may lead to an undesirable increase in the signal traffic load (processing load) on the server. There is therefore a need to suppress increasing the processing load on the server to prevent processing delays by the server.

SUMMARY

A network system according to at least one embodiment of the invention in which a client sends a response request to a server at an interval suppresses increasing the processing load on the server.

To achieve the foregoing objective, a network system according to at least one embodiment of the invention has a client configured to transmit response requests at a specific interval, and a server configured to send a response to the client according to a response request received from the client, connected over a network. The server calculates a communication interval indicating an interval at which the client transmits the response requests based on a factor affecting the processing load of the server, and sends communication interval information indicating the calculated communication interval to the client. The client transmits the response requests at an interval corresponding to the interval indicated by the communication interval information received from the server.

Stated differently, objects of the present invention are met in a network system having: a network; a client coupled to the network and configured to transmit response requests at specific time intervals; and a server coupled to the network, configured to receive the respond requests from the client, and to send a response to the client in response to a received response request; wherein: the server calculates a communication interval indicating a time interval at which the client is to transmit response requests, the communication interval being calculated based on a factor affecting a processing load of the server; the server sends communication interval information indicating the calculated communication interval to the client; and the client uses the calculated communication interval indicated by its received communication interval information as its specific time interval, and transmits its response requests at the calculated communication interval indicated by the its received communication interval information.

Because the client transmits response requests to the server at the interval indicated by a communication interval calculated based on factors affecting the processing load on the server, this configuration prevents a high concentration of response requests being sent in a short time period from multiple clients to the server, and suppresses an increase in the processing load of the server due to a high concentration of response requests being sent in a short time period.

In a network system according to another aspect of the invention, the client is connected to a processing device, receives processing device status information related to a condition of the processing device from the connected processing device, and transmits status data including the received processing device status information to the server as the response request at an interval corresponding to the interval indicated by the communication interval information.

That is, the network system may further include a periphery device connected to the client, wherein: the client receives status information from the periphery device, the status information being related to an operating state of the periphery device; and the client transmits status data including the status information received from the periphery device to the server as a response request at the indicated calculated communication interval.

This configuration enables the client to report the status of a processing device to a server at a regular interval while suppressing the processing load of the server from increasing due to a high concentration of status data, which is a response request, being transmitted in a short time.

In a network system according to another aspect of the invention, the factor affecting the processing load of the server includes the number of clients connected to the server.

This configuration enables calculating a communication interval of an appropriate value considering a characteristic of the network system, that is, the number of clients connected to the server.

In a network system according to another aspect of the invention, the factor affecting the processing load of the server is at least one of the processing capacity of the server, the amount of data received as a response request from the client, and the time required to process the data received as a response request from the client.

This configuration enables calculating a communication interval of an appropriate value reflecting specific factors affecting the processing load of the server.

In a network system according to another aspect of the invention, the server includes a communication interval calculator to calculate the communication time interval indicating the interval at which the client transmits response requests; and the client includes an interval updater configured to change the interval for transmitting response requests based on the interval indicated by the communication interval information.

This configuration uses functions of the communication interval calculator of the server and the interval updater of the client to suppress increasing the processing load of the server and delayed processing by the server due to a high concentration of response requests in a short time.

In a network system according to another aspect of the invention, the client transmits the response request after delaying transmission for a randomly set time following booting up or following resumption of communication after a period when (network) communication was prohibited, or otherwise not possible, such as if the network was down of the client's network interface card (NIC) or network cable was faulty.

This configuration creates an offset in the timing of response request transmission by multiple clients that boot up or resume communication at the same time, and can prevent server access by multiple clients being concentrated at the same time.

In a network system according to another aspect of the invention, multiple clients are connected to the server. When the server receives a response request transmitted from one client after the one client boots up or resumes communication is received, the server sends to the one client a response including information specifying the timing for the one client to transmit the next response request so that an offset is created between the timing that the one client sends the response requests at the specific interval and the timing that another client sends the response requests at the specific interval. After transmitting the response request at the timing specified by the server, the one client transmits the next response request at the specific interval.

In other words, an embodiment may include a plurality of clients connected to the server via the network. In this case, when the server receives a response request transmitted from one of the plurality of clients (one client) following the booting up or resumption of communication (following a period when communication was prohibited) of the one client, the server sends to the one client a response including information specifying an offset time for the one client to be added to its corresponding specific time interval when it next transmits a response request so that a time offset is created between the time when the one client sends its response requests at a specific time interval and the time when another of the plurality of clients having the same specific time interval sends its response requests; and after transmitting the response request with the time offset specified by the server, the one client transmits its next response request without the offset time at its specific time interval.

This configuration can desirably offset the intervals at which multiple clients transmit response requests by a function of the server, and can more effectively keep the clients from accessing the server at the same time.

In a network system according to another aspect of the invention, the server specifies the timing at which a client that transmits response requests of a size exceeding a specific threshold transmits the next response request so that the value of the time difference between the timing when a response request is transmitted after booting or communication resumes and the timing when the next response request is transmitted is different from the value of the specific interval.

Essentially in this embodiment, the server sends the information specifying the offset time to the one client that transmits a response request of a size exceeding a specific threshold, the offset time is added to the one client's specific time interval when it next boots up or resumes communication after a period when communication was prohibited.

This configuration can increase the offset between the timing when a client that transmits a large amount of response request data and the timing when other clients transmit response requests, and can more efficiently and effectively suppress access by the clients to the server being concentrated in a short period of time.

In a network system according to another aspect of the invention, one or more processing devices can connect to the client. The client transmits status data including information related to the state of a connected processing device as a response request. The server sets the timing at which a client having more than a specific threshold number of processing devices connected transmits the next response request so that the value of the time difference between the timing when a response request is transmitted after booting or communication resumes and the timing when the next response request is transmitted is different from the value of the specific interval.

Stated differentially, the plurality of clients have respective, connected periphery devices, and each client transmits status data as a response request. The status data includes information related to operating states of the client's connected periphery devices. The server sends the response including information specifying the offset time to the clients that have more than a specific threshold number of connected periphery devices. The offset time is then added to the client's corresponding specific time interval when it next boots up or resumes communication after period when communication was prohibited, or otherwise not possible.

Recognizing that the amount of data the client transmits as response requests increases as the number of connected processing devices increases, this configuration can more efficiently and effectively prevent client access to the server being concentrated in a short period of time.

In a network system according to another aspect of the invention, the client is a printing device having a print unit (a print mechanism) that prints on a recording medium, and transmits the response requests at the specific time intervals.

Because the printer transmits response requests to the server at the interval indicated by a communication interval calculated based on factors affecting the processing load on the server, this configuration prevents a high concentration of response requests being sent in a short time from the printer to the server, and suppresses an increase in the processing load of the server due to a high concentration of response requests being sent in a short time.

In a network system according to another aspect of the invention, the printing device transmits status data including processing device status information related to the print unit as the response request at an interval corresponding to the interval indicated by the communication interval information.

This configuration enables the printer to report processing device status information related to the print unit to a server at a regular interval while suppressing the processing load of the server from increasing due to status data, which is a response request, being transmitted at a high concentration in a short time.

Another aspect of the invention is a client device configured to connect through a network to a server and transmit response requests at a specific time interval, and having a control unit (a controller) that delays transmitting a response request by a randomly set time following booting up or following resumption of communication after a period when (network) communication was prohibited, or not possible.

This configuration creates an offset in the timing of response request transmission by multiple clients that boot up or resume communication at the same time, and can prevent server access by multiple clients being concentrated at the same time.

Another aspect of the invention is a communication control method of a network system including a client configured to transmit response a request at a specific time interval, and a server configured to send a response to the client in response to receiving a response request from the client. The present method includes using the server to calculate a communication interval indicating a time interval at which the client is to transmit the response request based on a factor affecting a processing load of the server, and to send communication interval information indicating the calculated communication interval to the client. The client transmits the response request at an interval corresponding to the interval indicated by the communication interval information received from the server.

Because the client transmits response requests to the server at the interval indicated by a communication interval calculated based on factors affecting the processing load on the server, this configuration prevents a high concentration of response requests being sent in a short time from the client to the server, and suppresses an increase in the processing load of the server due to a high concentration of response requests being sent in a short time.

Other objects and attainments together with a fuller understanding of the invention will become apparent and appreciated by referring to the following description and claims taken in conjunction with the accompanying drawings.

BRIEF DESCRIPTION OF THE DRAWINGS

FIG. 8 illustrates a data structure of a status database in accord with the present invention.

DESCRIPTION OF EMBODIMENTS

Embodiment 1

A first embodiment of the present invention is described below with reference to the accompanying figures.

Figure 1:
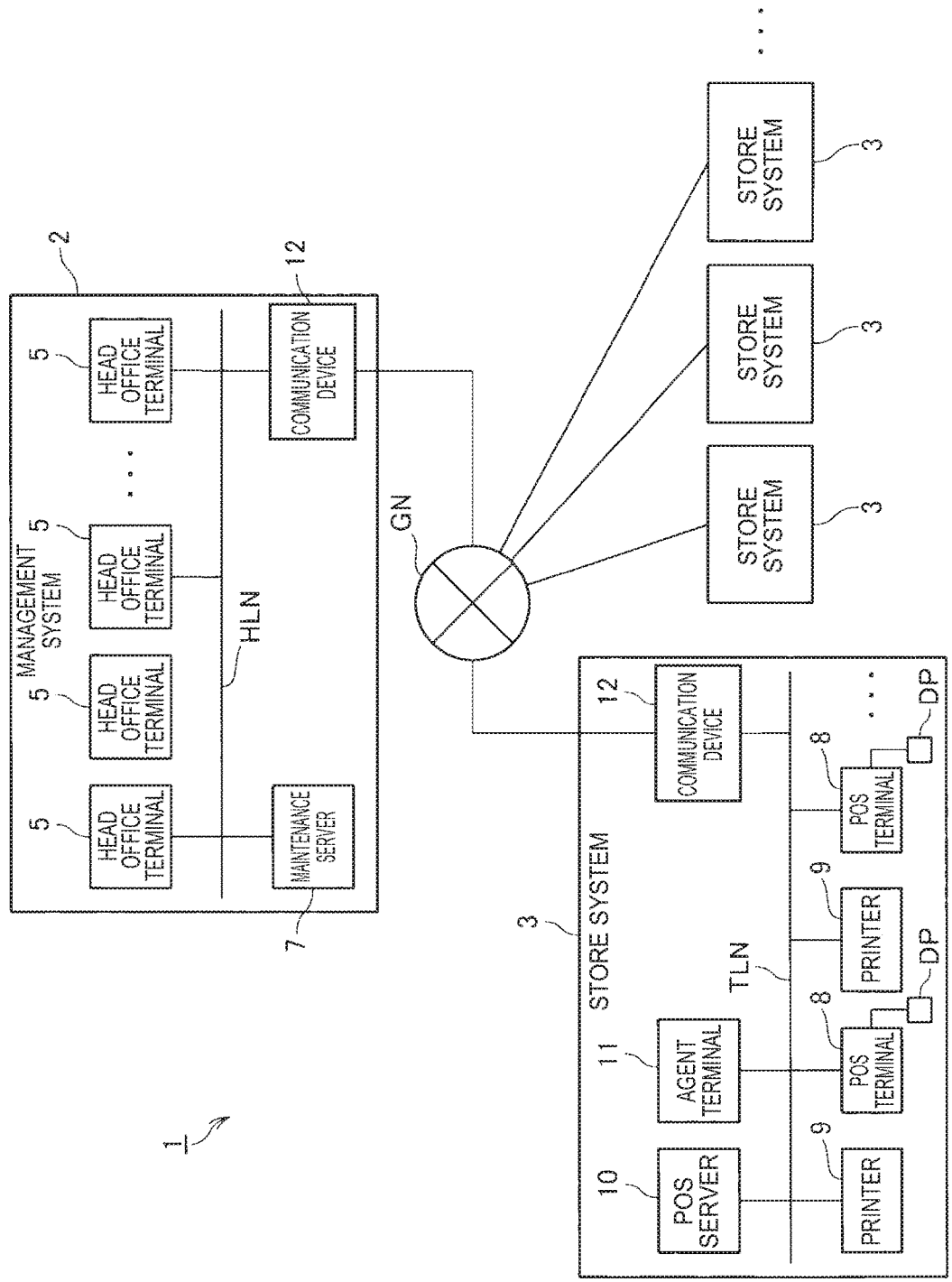
FIG. 1 illustrates a configuration of a network system according to an embodiment of the invention.

FIG. 1 illustrates the configuration of a network system 1 according to the first embodiment of the invention. The network system 1 is a system used by a company that manages stores, such as supermarkets, convenience stores, department stores, or restaurants, that provide products or services and process transactions according to the provided product or service.

As shown in FIG. 1, the network system 1 includes a management system 2 and multiple store systems 3. The management system 2 and each of the store systems 3 are communicatively connected through a global network GN, which may include the Internet and/or other networks.

The management system 2 is a system deployed in a head office of a company using the network system 1. As shown in FIG. 1, the management system 2 includes a home office-side local area network HLN. One or more head office terminals 5, a maintenance server 7 (server), and a communication device 12 are connected to the home office-side local area network HLN.

The communication protocol used over the home office-side local area network HLN may be any desirable protocol, and communication through the home office-side local area network HLN may be by wired communication and/or wireless communication.

Each head office terminal 5 is a computer used in the home office by company employees or other corporate personnel.

The maintenance server 7 is a network server that communicates with an agent terminal 11 (client), described further below, and that manages the status of printers 9 (processing devices, or periphery devices) described further below.

The configuration, function, and processes based on the functions of the maintenance server 7 are described further below.

The head office terminal 5 and maintenance server 7 can communicate through the home office-side local area network HLN.

The communication device 12 is an interface device (e.g. network gateway) that connects a local area network such as the home office-side local area network HLN or a store-side local area network TLN, described further below, to the global network GN. The communication device 12 may include the functions of a modem (or ONU (Optical Network Unit)), a router, a NAT (Network Address Translation) function, and/or a DHCP (Dynamic Host Configuration Protocol).

The communication device 12 relays data that is sent and received when a device connected to a local area network (such as HLN or TLN) and a device connected to the global network GN communicate. Note that in FIG. 1 the communication device 12 is represented by a single block, but the communication device 12 may comprise multiple devices with specific functionality.

The maintenance server 7 of the management system 2 uses functions of the communication device 12 to communicate with the agent terminal 11 through the home office-side local area network HLN, global network GN, and the store-side local area network TLN, described below.

The store system 3 is a system used in a store.

As shown in FIG. 1, the store system 3 has a store-side local area network TLN; that is, a local area network deployed in the store. One or more point of sale (POS) terminals 8, a printer 9 connected to (or coupled to, or in communication with) each POS terminal 8, a POS server 10, an agent terminal 11 (client), and a communication device 12 connect to the store-side local area network TLN. A display DP, which can be seen by the checkout clerk at a checkout counter, is connected to the POS terminal 8, and transaction-related information and other information are displayed on the display DP.

The communication protocol used over the store-side local area network TLN may be any desirable network communication protocol, and communication through the local area network may be by wired communication and/or wireless communication.

The printer 9 is a device with a printing function. The printer 9 is disposed at a checkout counter where customers complete transactions in the store.

The POS terminal 8 is a device that communicates with the printer 9 and controls the printer 9. As described further below, the POS terminal 8 acquires required information and executes a transaction process when a sales transaction is processed in the store system 3, and controls the printer 9 to produce a receipt based on the sales transaction process. The receipt produced by the printer 9 is then given by the checkout clerk to the customer.

The agent terminal 11 is a device with a function for sending information related to the condition (status) of the printer 9 to a maintenance server 7.

The configurations, functions, and processes of the POS terminal 8, printer 9, POS server 10, and agent terminal 11 are described further below.

In the store system 3, the POS terminal 8, printer 9, POS server 10, and agent terminal 11 can communicate through the store-side local area network TLN.

The agent terminal 11 of the store system 3 uses functions of the communication device 12 to communicate with the maintenance server 7 through the store-side local area network TLN, global network GN, and home office-side local area network HLN.

Note that in FIG. 1 the maintenance server 7 and POS server 10 are represented by single function blocks, but this does not mean the servers are configured by single server devices. For example, the maintenance server 7 and POS server 10 may each be configured to include multiple server devices.

Communication between the maintenance server 7 and agent terminal 11 is made secure by using a virtual private network (VPN) or other type of encryption technology or virtual dedicated line (or physical dedicated line) technology.

Figure 2:
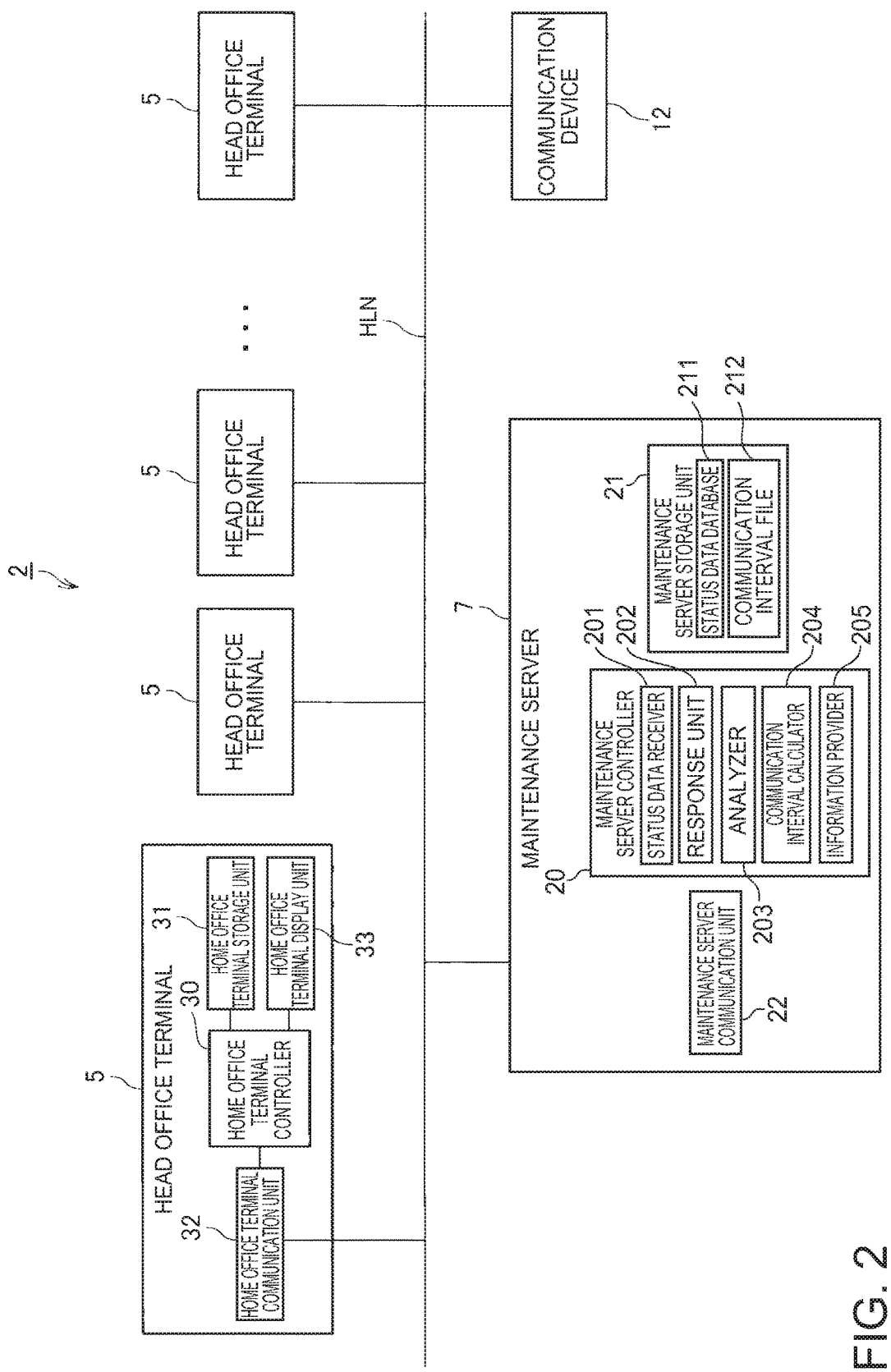
FIG. 2 is a block diagram illustrating a functional configuration of devices (components) in a management server.

FIG. 2 shows a block diagram illustrating the functional configuration of the maintenance server 7 of the management system 2 and the head office terminal 5.

As shown in FIG. 2 the maintenance server 7 has a maintenance server controller 20, maintenance server storage unit 21 (maintenance server storage 21), and maintenance server communication unit 22 (maintenance server communicator/transceiver 22 or network interface controller, NIC, 22).

The maintenance server controller 20 includes a CPU, ROM, RAM, and other peripheral circuits not shown, and controls the maintenance server 7.

The maintenance server controller 20 has a status data receiver 201, response unit 202 (responder 202), analyzer 203, communication interval calculator 204, and information provider 205. These function blocks execute processes by means of cooperation of hardware and software, such as by the CPU reading and running (executing) a program (such as a specialized application that runs on specific server software). The functions and processes based on the functions of these function blocks are described further below.

The maintenance server storage unit 21 comprises non-volatile storage (memory) such as a solid state drive and/or hard disk drive and/or an EEPROM device and/or flash memory, and stores data.

The maintenance server communication unit (e.g. network interface controller, NIC) 22 accesses the global network GN as controlled by the maintenance server controller 20 to communicate with devices (including an agent terminal 11) connected to the network.

As shown in FIG. 2, the head office terminal 5 has a home office terminal controller 30, home office terminal storage unit 31 (home office terminal storage/memory 31), home office terminal communication unit 32 (home office terminal communicator/transceiver/NIC 32), and home office terminal display unit 33 (home office terminal display 33). The home office terminal controller 30 controls the head office terminal 5. The home office terminal storage unit 31 stores data. The home office terminal communication unit 32 communicates as controlled by the home office terminal controller 30. The home office terminal display unit 33 has an LCD display other type of display (device), and displays information as controlled by the home office terminal controller 30.

Figure 3:
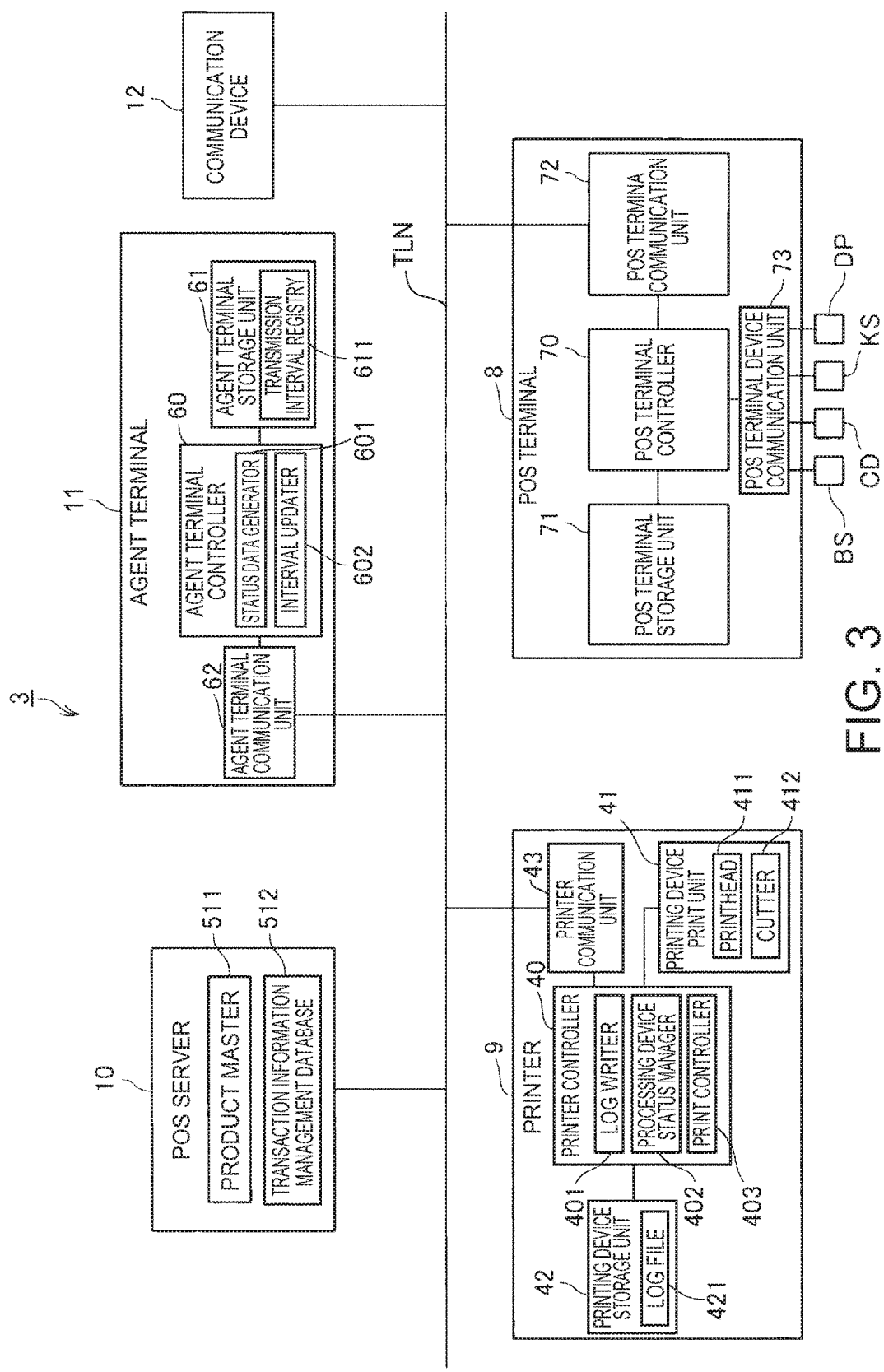
FIG. 3 is a block diagram illustrating a functional configuration of devices (components) in a store system.

FIG. 3 is a block diagram illustrating the functional configuration of the POS terminal 8, printer 9, POS server 10, and agent terminal 11.

The POS terminal 8 is a host computer that controls the printer 9. More specifically, the POS terminal 8 executes a transaction process based on the transaction performed at the checkout counter, controls the printer 9 based on the transaction process, and causes the printer 9 to produce a receipt.

As shown in FIG. 3, the POS terminal 8 has a POS terminal controller 70, POS terminal storage unit 71 (POS terminal storage 71), POS terminal communication unit 72 (POS terminal communicator 72), and POS terminal (periphery) device communication unit 73 (POS terminal (periphery) device communicator 73).

The POS terminal controller 70 has CPU, ROM, RAM, and other circuit components not shown, and controls the POS terminal 8.

The POS terminal storage unit 71 has nonvolatile memory and stores data.

The POS terminal communication unit 72 communicates with external devices as controlled by the POS terminal controller 70.

The POS terminal (periphery) device communication unit 73 has an interface board with a USB port, a port conforming to a non-USB serial communication standard, or port conforming to another communication protocol. The POS terminal device communication unit 73 communicates with devices connected to the port as controlled by the POS terminal controller 70. Note that the POS terminal device communication unit 73 may have a wireless communication capability and be configured to communicate with devices wirelessly.

In the example shown in FIG. 3, a barcode scanner BS, customer display CD, cash drawer KS, and display DP connect as periphery devices of the POS terminal 8.

The barcode scanner BS reads barcodes from products and product packaging, and outputs data representing the read result to the POS terminal device communication unit 73. The POS terminal device communication unit 73 outputs the data input from the barcode scanner BS to the POS terminal controller 70.

The customer display CD is an LCD display or other type of display device, and displays information as controlled by the POS terminal controller 70. Information displayed on the customer display CD can be seen by the customer in the transaction at the checkout counter.

The cash drawer KS has a tray for holding money, mechanisms for locking and unlocking the tray, and a mechanism for kicking out (opening) the tray, and releases the lock and kicks out the tray as controlled by the POS terminal controller 70.

The display DP is an LCD display or other type of display device, and displays information as controlled by the POS terminal controller 70.

The printer 9 is a thermal line printer that stores roll paper and prints images by forming dots on the roll paper with a thermal line head.

As shown in FIG. 3, the printer 9 has a printer controller 40, printing device print unit 41 (printing device print mechanism 41), printing device storage unit 42 (printing device storage 42), and printer communication unit 43 (printer communicator, communication interface, 43).

The printer controller 40 may include a CPU, ROM, RAM, and other circuit components not shown. Printer controller 40 controls the printer 9.

The printer controller 40 includes a log writer 401, processing device status manager 402, and print controller 403. These function blocks execute processes by the cooperation of hardware and software, such as a CPU reading and running a program (such as firmware). The functions and processes based on the functions of these function blocks are described further below.

In addition to a mechanism not shown for conveying roll paper stored inside a cabinet of the printer 9, the printing device print unit 41 has a printhead 411 and a cutter 412. The printhead 411 is preferably a thermal line head disposed with multiple heat elements corresponding to the resolution in the direction transversely to the conveyance direction of the roll paper arranged in a line, and forms dots on the roll paper, which in this example is thermal roll paper, by desirably heating selected heat elements. The cutter 412 has a fixed knife and a movable knife, and cuts the roll paper by moving the movable knife relatively to the fixed knife, causing the fixed knife and movable knife to cross and cut the roll paper between the knives. The printing device print unit 41 prints receipt-related images on the roll paper with the printhead 411 while conveying the roll paper with the conveyance mechanism, and cuts the roll paper at a specific position by the cutter 412 as controlled by the printer controller 40, producing a receipt.

The printing device storage unit 42 has nonvolatile memory and stores data.

The printer communication unit 43 accesses the store-side local area network TLN and communicates as controlled by the printer controller 40 with devices (including the POS terminal 8, POS server 10, and agent terminal 11) connected to the store-side local area network TLN.

As shown in FIG. 3 the POS server 10 stores a product master 511 and transaction information management database 512. The product master 511 relationally stores product code, price, and other information about products sold in the store. The transaction information management database 512 is described further below.

The agent terminal 11 has an agent terminal controller 60 (control unit), agent terminal storage unit 61 (agent terminal storage 61), and agent terminal communication unit 62 (agent terminal communicator 62).

The agent terminal controller 60 has a CPU, ROM, RAM, and other peripheral circuits not shown, and controls the agent terminal 11.

The agent terminal controller 60 has a status data generator 601 and interval updater 602. These function blocks execute processes by the cooperation of hardware and software, such as a CPU reading and running a program (client software corresponding to the server software of the maintenance server 7). The functions and processes based on the functions of these function blocks are described further below.

The agent terminal storage unit 61 has nonvolatile memory and stores data.

The agent terminal communication unit 62 accesses the store-side local area network TLN and communicates as controlled by the agent terminal controller 60 with devices connected to the local area network (including the POS terminal 8, printer 9, and POS server 10). The agent terminal communication unit 62 also controls the communication device 12 as controlled by the agent terminal controller 60 to communicate with the maintenance server 7 through the store-side local area network TLN, global network GN, and home office-side local area network HLN.

As described above, the network system 1 includes a maintenance server 7. The maintenance server 7 manages the status of printers 9 in the store system 3. The maintenance server 7 also provides information that is useful for printer 9 maintenance to the person (referred to below as the maintenance technician) responsible for maintaining the printers 9 of the store system 3.

The operation of devices in the network system 1 when managing the status of the printers 9 is described next.

The agent terminal 11 and maintenance server 7 communicate as described basically below according to HTTP (Hypertext Transfer Protocol). More specifically, the agent terminal 11 is an example of a client in a client-server system and the maintenance server 7 is a server in a client-server system. The agent terminal 11 sends an HTTP request (response request) to the maintenance server 7. As described below, the agent terminal 11 sends an HTTP request at a specific interval to the maintenance server 7. That is, agent terminal 11 sends HTTP requests (i.e. request messages or response requests) at regular time intervals to maintenance server 7. When an HTTP request is received, the maintenance server 7 sends a HTTP response (response) to the agent terminal 11.

As a result, data can be sent and received between the agent terminal 11 and maintenance server 7 by the agent terminal 11 sending a response request to the and maintenance server 7 and the maintenance server 7 returning to the agent terminal 11 a response to the response request. Maintenance server 7 may send data to a specific agent terminal 11 only in response to a response request from the specific agent terminal 11. That is, maintenance server 7 communicates with a specific terminal in the form of data transmitted as a response to a response request from the specific the agent terminal 11. As a result, maintenance server 7 may not transmit data asynchronously to any specific agent terminal 11.

Figure 4:
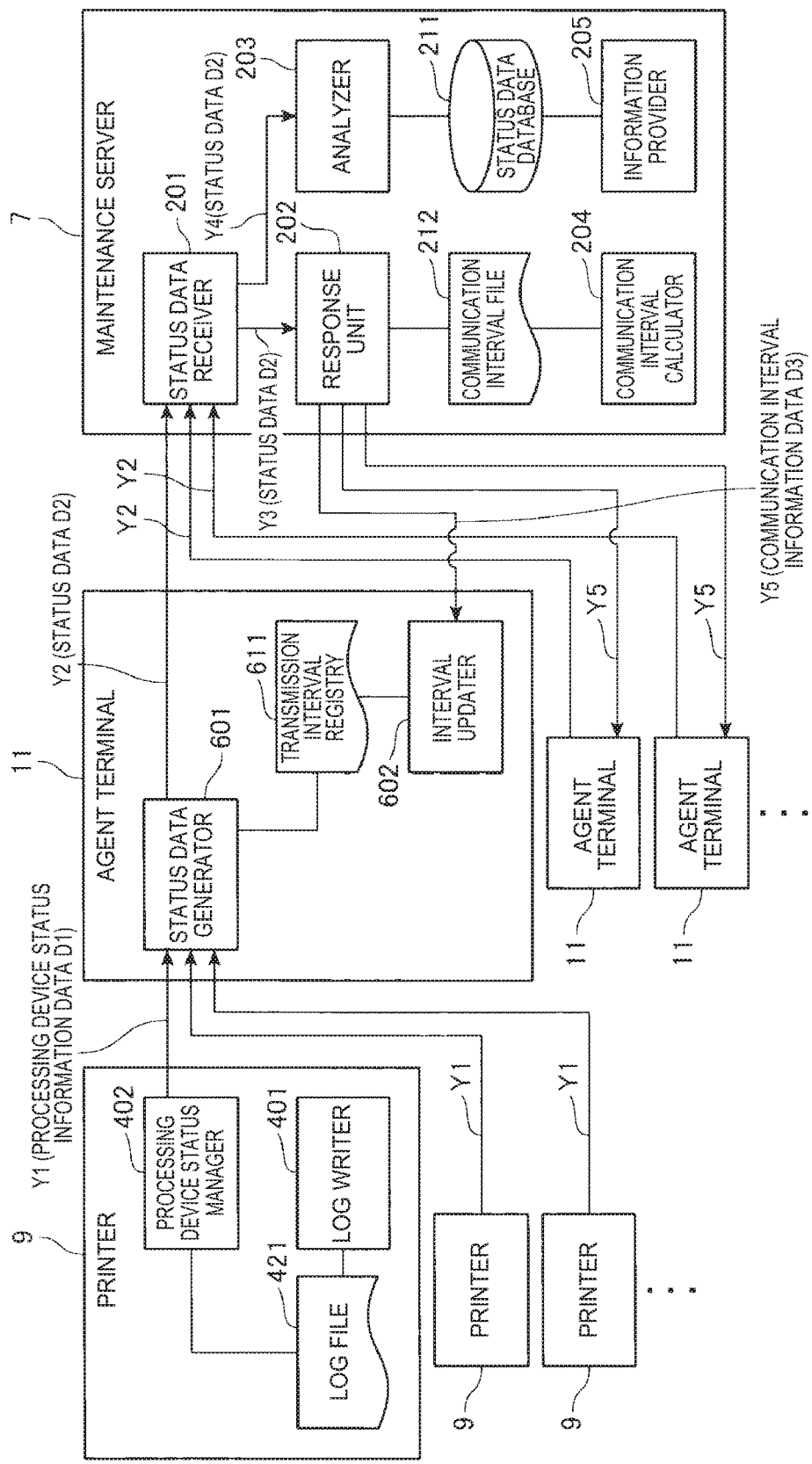
FIG. 4 illustrates the flow of data between devices in the network system.

FIG. 4 shows function blocks of the printer controller 40 of the printer 9, function blocks of the agent terminal controller 60 of the agent terminal 11, and function blocks of the maintenance server controller 20 of the maintenance server 7 together with associated data.

The basic flow of data sent and received between the function blocks of the printer 9, agent terminal 11, and maintenance server 7, which permits the maintenance server 7 to manage the status of a printer 9, is described with reference to FIG. 4.

Note that details about the processes of the function blocks, the content of data sent and received between the function blocks, and the information contained in the communicated data, are omitted from the following description of FIG. 4.

As shown in FIG. 4, the log writer 401 of the printer 9 writes log information to the log file 421 at specific times.

The log file 421 is a file to which log information is written.

The log information is a record of multiple log items.

A log item is a operating state that is monitored for changes, and is previously defined as a log item to be monitored and recorded (logged). Examples of log items in this embodiment of the invention include printer errors, the total number of lines formed by the printhead (total printed line count), and the total number of times the cutter was used (total cutter operation count).

Note that these are examples of log items used in this embodiment of the invention, and other log items may be logged in addition to the foregoing log items or instead of one or more of the foregoing log items. For example, other log items may include log items (operating states) related to periphery devices connected to the printer 9, and log items related to communication (such as the data transfer rate).

Information indicating if a printer error occurred, information indicating if a printer error was resolved, and information indicating the date and time of such events are recorded chronologically as a log of printer errors in the log file 421. A printer error occurs when normal printing is not possible, such as when the roll paper runs out, the roll paper jams, or the printhead 411 overheats.

The log writer 401 monitors if a printer error occurred and if the printer error was resolved (log item: monitor printer error status), and records a log of printer error log items in the log file 421.

Information denoting the total number of lines printed by the printhead, and information denoting the current time and date, are recorded chronologically in the log file 421 as a log of total printed line count log items.

The total printed line count is the total number of lines printed by the printhead 411. As described above, the printing device print unit 41 of the printer 9 in this first embodiment of the invention prints images by repeatedly alternating between forming one line of dots with the printhead 411, and conveying the roll paper one line by the conveyance mechanism. As also described above, printing a line means forming one line of dots with the printhead 411.

The log writer 401 acquires the total number of lines printed by the printhead during a specific time (log item: monitoring total printed line count), and records a log of total printed line count log items in the log file 421.

Information denoting the cumulative total number of times the cutter is used, and information denoting the current time and date, are recorded chronologically in the log file 421 as a log of total cutter operation count log items.

The total cutter operation count is the total number of times the cutter 412 cuts the roll paper.

The log writer 401 acquires the total cutter operation count at a specific interval (log item: monitoring the total cutter operation count) and records a log of total cutter operation count log items in the log file 421.

As shown in FIG. 4, the processing device status manager 402 of the printer 9 generates processing device status information data D1 (processing device status information) based on the log information written to the log file 421 at specific times. The processing device status manager 402 sends the generated processing device status information data D1 to the agent terminal 11 (arrow Y1).

The status data generator 601 of the agent terminal 11 receives the processing device status information data D1 from the printer 9 connected to the store-side local area network TLN to which the agent terminal 11 is connected. The status data generator 601 references the transmission interval registry 611 and generates status data D2 based on the received processing device status information data D1 at the time interval specified by the transmission interval registry 611. The status data generator 601 sends the generated status data D2 to the maintenance server 7 (arrow Y2). In other words, the status data generator 601 generates and sends the status data D2 to the maintenance server 7 at the time interval indicated in the transmission interval registry 611.

The status data generator 601 sends the status data D2 to the maintenance server 7 as an HTTP request using the HTTP communication protocol.

The status data receiver 201 of the maintenance server 7 receives the status data D2. The status data receiver 201 outputs the status data D2 to the response unit 202 (arrow Y3). The status data receiver 201 also outputs the received status data D2 to the analyzer 203 (arrow Y4).

The response unit 202 references the communication interval file 212 and generates communication interval information data D3 including communication interval information indicating the communication time interval, and outputs the generated communication interval information data D3 to the agent terminal 11 (arrow Y5). The response unit 202 sends the communication interval information data D3 to the agent terminal 11 as an HTTP response (using the HTTP communication protocol) to the previously received HTTP request.

The analyzer 203 then updates the status data database 211 based on the status data D2 input from the status data receiver 201.

The communication interval calculator 204 updates the communication interval file 212 by a method described below.

When accessed from the head office terminal 5 by the method described below, the information provider 205 references the status data database 211 and provides information useful for managing the printer 9.

The interval updater 602 of the agent terminal 11 receives the communication interval information data D3. The interval updater 602 updates the transmission interval registry 611 based on the communication interval information contained in the received communication interval information data D3.

The status data generator 601 then references the transmission interval registry 611, and at the time interval indicated in the file generates and sends status data D2 to the maintenance server 7.

As described above, data is sent and received between the agent terminal 11 and the maintenance server 7 through a process of the agent terminal 11 intermittently sending status data D2 to the maintenance server 7 at specified time intervals, and the maintenance server 7 specifying the time intervals by sending communication interval information data D3 to the agent terminal 11.

The operation of the printer 9, agent terminal 11, and maintenance server 7 when managing the status of the printer 9 is described next.

Figure 5:
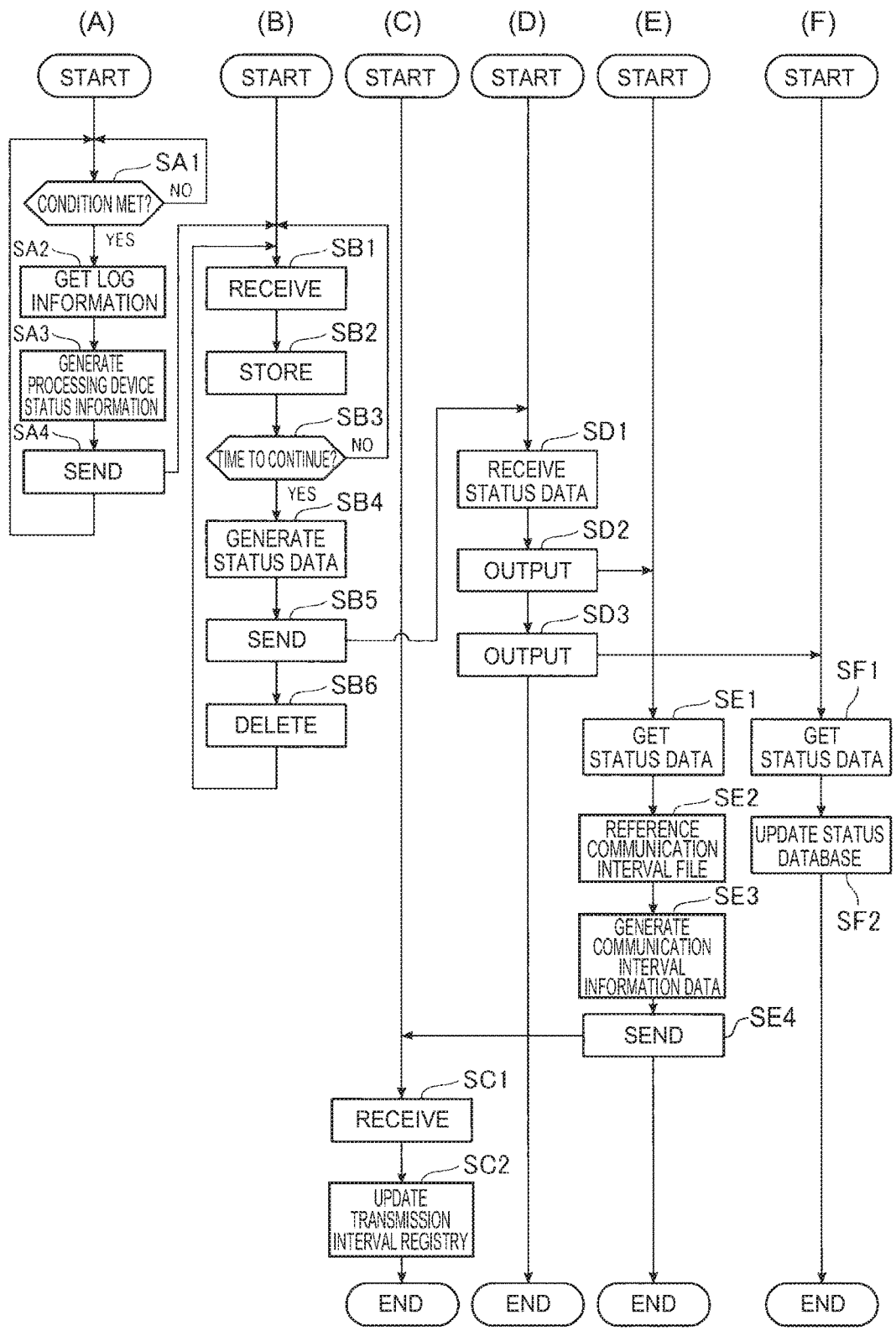
FIG. 5 is an operational flow chart of devices in the network system.

FIG. 5 is a flow chart of the operation of the printer 9, agent terminal 11, and maintenance server 7.

Column (A) of FIG. 5 shows the operation of the processing device status manager 402 of the printer 9, column (B) of FIG. 5 shows the operation of the status data generator 601 of the agent terminal 11, column (C) of FIG. 5 shows the operation of the interval updater 602 of the agent terminal 11, column (D) of FIG. 5 shows the operation of the status data receiver 201 of the maintenance server 7, column (E) of FIG. 5 shows the operation of the response unit 202 of the maintenance server 7, and column (F) of FIG. 5 shows the operation of the analyzer 203 of the maintenance server 7.

Note that the following description referring to FIG. 5 assumes that the agent terminal 11 has already completed sending at least the first status data D2 after sending the initial response request data. As will be understood below, the agent terminal 11 sends the status data D2 specified by the maintenance server 7 when sending the first status data D2 after sending the initial response request data described below.

As shown in column (A) of FIG. 5, the processing device status manager 402 of the printer 9 monitors for the occurrence of a transmission condition for generating and sending the processing device status information data D1 (step SA1). The condition for generating and sending the processing device status information data D1 may be, for example, that a previously set timing has been reached, or the status of a particular log item has changed to a previously selected specific state. An example of a printer error log item (i.e. that the status of a particular log item has changed to a previously specified/set specific state) that may be used as a condition for generating and sending device status information D1 is when a printer error occurs or when the printer error is resolved.

If the condition for generating and sending the processing device status information data D1 is met, the processing device status manager 402 references the log file 421 and acquires the log information required to generate the processing device status information data D1 from the log items recorded in the log file 421 (step SA2). In the first embodiment, the most recent the printer error log item, total printed line count log item, and total cutter operation count log item entries are included in the log information required to generate the processing device status information data D1 irrespective of what triggering condition for generating and sending status information data D1 occurred.

Next, the processing device status manager 402 generates the processing device status information data D1 based on the log information acquired in step SA2 (step SA3).

Figure 6:
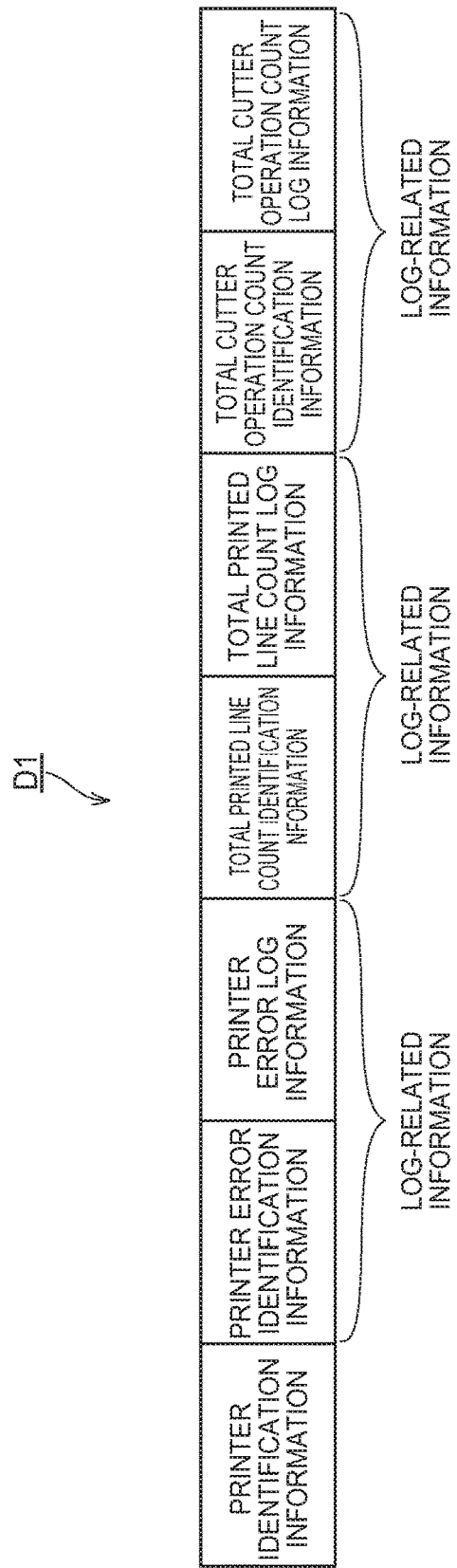
FIG. 6 illustrates an example of types of information contained in "processing device status information" data D1 produced by "processing device" status manager 402 FIG. 4.

FIG. 6 illustrates information contained in the processing device status information data D1.

As shown in FIG. 6, the processing device status information data D1 includes printer identification information. The printer identification information (referred to below as the printer ID) is information uniquely identifying the printer 9. The serial number (a number uniquely assigned to each printer 9 when the printer 9 is manufactured) of the printer 9 may be used as the printer ID.

The processing device status information data D1 also contains log-related information for each log item. More specifically, the processing device status information data D1 contains log-related information for the printer error log item, log-related information for the total printed line count log item, and log-related information for the total cutter operation count log item.

The log-related information contains log item identification information (referred to below as the log item ID) identifying a particular log item, and log item log information, which is the information logged for the corresponding log item.

More specifically, the log-related information of the printer error log item contains a log item ID identifying the printer error log item (referred to below as the printer error ID), and log item log information for the printer error log item (referred to below as the printer error log information).

The log-related information for the total printed line count log item contains a log item ID identifying the total printed line count log item (referred to below as the total printed line count ID), and log item log information for the total printed line count log item (referred to below as the total printed line count log information).

The log-related information of the total cutter operation count log item includes log item identification information identifying the total cutter operation count log item (referred to below as the total cutter operation count ID), and the log item log information for the total cutter operation count log item (referred to below as the total cutter operation count log information).

After generating the processing device status information data D1 in step SA3, the processing device status manager 402 controls the printer communication unit 43 to transmit the generated processing device status information data D1 (step SA4), and then returns to step SA1.

As shown in column (B) of FIG. 5, the status data generator 601 of the agent terminal 11 controls the agent terminal communication unit 62 to receive the processing device status information data D1 (step SB1).

Next, the status data generator 601 stores the received processing device status information data D1 in a specific storage area of the agent terminal storage unit 61 (step SB2).

If in step SB2 other processing device status information data D1 containing printer ID that is different from the value of the printer ID contained in the processing device status information data D1 received in step SB1 is already stored in the specific storage area, the status data generator 601 stores the processing device status information data D1 received in step SB1 without deleting the other processing device status information data D1. However, if in step SB2 other processing device status information data D1 containing printer ID that is the same as the value of the printer ID contained in the processing device status information data D1 received in step SB1 is already stored in the specific storage area, the status data generator 601 deletes the other processing device status information data D1 and stores the processing device status information data D1 received in step SM.

As a result, the processing device status information data D1 received most recently from each printer 9 is stored for each printer 9 in the specific storage area.

Parallel to receiving and storing the processing device status information data D1, the status data generator 601 references the transmission interval registry 611 and monitors if the time to generate the status data D2 has arrived (has been reached) (step SB3).

The transmission interval registry 611 is a file storing information indicating the interval for generating and transmitting status data D2. In step SB3, the status data generator 601 references the transmission interval registry 611, and determines it is time to generate status data D2 if the time interval (period) set in the transmission interval registry 611 has past since the last time the status data D2 was generated and sent.

If the time for generating status data D2 has come (been reached) (step SB3: YES), the status data generator 601 generates status data D2 based on the processing device status information data D1 stored in the specific storage area (step SB4).

The status data D2 is text data (such as XML (eXtensible Markup Language) data) storing information in a hierarchical structure using a combination of hierarchical keys and values, and is data that can be transmitted to the maintenance server 7 as a request.

Figure 7:
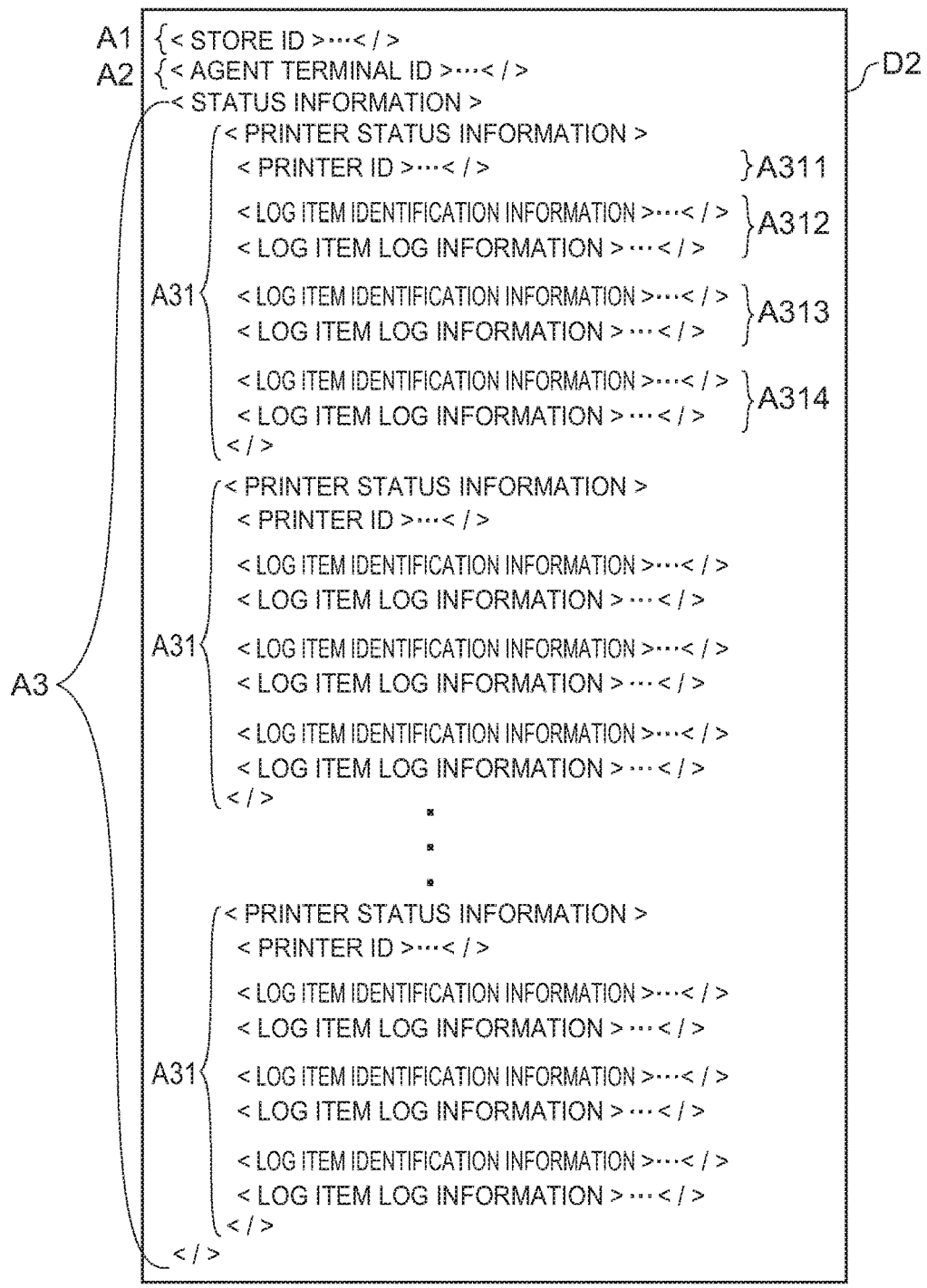
FIG. 7 shows a structure/format example of status data D2 generated based on the "processing device status information" data D1.

FIG. 7 illustrates the structure (format) of the content of the status data D2.

The status data D2 contains store identification information (referred to below as the store ID) identifying the store where the agent terminal 11 that generated the status data D2 is deployed. The store ID is information uniquely identifying each store. The store ID indicating the store where the agent terminal 11 is deployed is previously registered in each agent terminal 11. In the status data D2 shown for example in FIG. 7, the store ID is written to line A1.

The status data D2 also contains agent terminal identification information (referred to below as the agent terminal ID) indicating the agent terminal 11 that generated the status data D2. The agent terminal ID is information uniquely identifying a particular agent terminal 11. The agent terminal ID identifying the agent terminal 11 is previously registered in each agent terminal 11. In the status data D2 shown for example in FIG. 7, the agent terminal ID is written to line A2.

Status information is written in the status data D2. The status information is information including printer status information (described below) for each printer 9 that is connected to the store-side local area network TLN to which the agent terminal 11 is also connected, and which has sent processing device status information data D1 to the agent terminal 11.

In the status data D2 shown for example in FIG. 7, the printer status information is written to line A31.

The printer status information includes the printer ID of the corresponding printer 9. In the status data D2 shown for example in FIG. 7, the printer ID is written to line A311.

The printer status information includes sets of log item identification information and log item log information for each log item. In the status data D2 shown for example in FIG. 7, the log item ID (printer error ID) and log item log information (printer error log information) of each printer error log item are written to line A312.

The log item ID (printhead line count ID) and log item log information (total printed line count log information log information) are written for the total printed line count log item on line A313.

The log item ID (total cutter operation count ID) and log item log information (total cutter operation count log information) are written to line 314 for the total cutter operation count log item.

The status data D2 thus contains store ID, agent terminal ID, as well as sets of log item ID and log item log information for each log item of each printer 9 that sent processing device status information data D1 to the agent terminal 11.

As shown in column (B) of FIG. 5, after generating the status data D2 in step SB4, the status data generator 601 controls the agent terminal communication unit 62 to send the generated status data D2 to the maintenance server 7 (step SB5). The process of step SB5 is an example of a process of sending a response request from a client to a server.

In step SB5 the status data generator 601 sends an HTTP request with the status data D2 in the request body to the maintenance server 7 by HTTP. Note that the URL of the maintenance server 7 to which the status data D2 is sent, the protocol to use, and other information required to send the status data D2 as a response request to the maintenance server 7 is previously set.

After sending the status data D2, the status data generator 601 deletes the processing device status information data D1 stored in the specific storage area (step SB6), and returns to step SB1.

As shown in column (D) of FIG. 5, the status data receiver 201 of the maintenance server 7 controls the maintenance server communication unit 22 to receive the status data D2 (step SD1).

Next, the status data receiver 201 outputs the received status data D2 to the response unit 202 (step SD2) and to the analyzer 203 (step SD3).

As shown in column (E) of FIG. 5, the response unit 202 acquires the status data D2 output by the status data receiver 201 (step SE1).

Next, the response unit 202 references the communication interval file 212 (step SE2). The communication interval file 212 is a file recording communication interval information indicating the communication interval, which is the interval at which the agent terminal 11 sends the status data D2, written by the communication interval calculator 204 using a method described below.

Next, the response unit 202 generates the communication interval information data D3 indicating the communication interval information based on the communication interval information recorded in the communication interval file 212 (step SE3).

Next, the response unit 202 controls the maintenance server communication unit 22 to send the generated communication interval information data D3 as a response to the agent terminal 11 (step SE4). In this example the response unit 202 sends an HTTP response having the communication interval information data D3 written in the response body to the agent terminal 11 by HTTP.

The process of step SE3 is an example of a process of the server sending a response to a client based on a response request received from the client.

As shown in column (C) of FIG. 5, the interval updater 602 of the agent terminal 11 controls the agent terminal communication unit 62 to receive the communication interval information data D3 (step SC1).

Next, the interval updater 602, based on the communication interval information contained in the communication interval information data D3, updates the transmission interval registry 611 so that the interval recorded in the file is the interval (communication interval) indicated by the communication interval information contained in the communication interval information data D3 (step SC2).

As a result of step SC2, the status data generator 601 thereafter generates and sends the status data D2 at the interval defined in the updated transmission interval registry 611.

As shown in column (F) of FIG., the analyzer 203 acquires the status data D2 output by the status data receiver 201 (step SF1).

Next, the analyzer 203 updates the status data database 211 based on the acquired status data D2 (step SF2). The process of step SF2 is described below.

FIG. 8 illustrates the data structure of the status data database 211.

As shown in FIG. 8, each record in the status data database 211 includes at least printer ID, printer error detection information, printhead error detection information, and cutter error detection information.

The printer error detection information is information indicating if a printer error occurred, and is either a value indicating an error occurred (YES in FIG. 8), or a value indicating an error did not occur (NO in FIG. 8).

The printhead error detection information is information indicating if a printhead error occurred, and is either a value indicating an error occurred (YES in FIG. 8), or a value indicating an error did not occur (NO in FIG. 8). A printhead error in this example indicates that the total printed line count of the printhead 411 exceeds a specific threshold used as the reference for determining the life of the printhead 411.

The cutter error detection information is information indicating if a printhead error occurred, and is either a value indicating an error occurred (YES in FIG. 8), or a value indicating an error did not occur (NO in FIG. 8). A cutter error in this example indicates that the total cutter operation count of the cutter 412 exceeds a specific threshold used as the reference for determining the life of the cutter 412.

In step SF2, the analyzer 203 acquires the printer status information contained in the status data D2. As described above, the printer status information contains sets of printer ID and the log item ID and log item log information for each log item.

Next, the analyzer 203 selects one entry of printer status information for processing, and by comparing the printer ID, identifies the matching record (the record with printer ID of the same value as the printer ID of the printer status information selected for processing) in the status data database 211. Next, the analyzer 203 updates the printer error detection information, printhead error detection information, and cutter error detection information based on the printer status information being processed.

More specifically, based on the printer error log information (log item log information) contained in the printer status information, the analyzer 203 determines if a printer error occurred; if an error occurred, changes the value of the printer error detection information to the value indicating a printer error occurred (was detected); and if an error has not occurred, changes the value of the printer error detection information to the value indicating a printer error has not occurred.

Based on the total printed line count log information (log item log information) contained in the printer status information, the analyzer 203 determines if the total printed line count exceeds a specific threshold; changes the value of the printhead error detection information to the value indicating a printhead error occurred (was detected) if the specific threshold was exceeded; and if the specific threshold was not exceeded, changes the value of the printhead error detection information to the value indicating a printhead error has not occurred.

Based on the total cutter operation count log information (log item log information) contained in the printer status information, the analyzer 203 determines if the total cutter operation count exceeds a specific threshold; changes the value of the cutter error detection information to the value indicating a cutter error occurred (was detected) if the specific threshold was exceeded; and if the specific threshold was not exceeded, changes the value of the cutter error detection information to the value indicating a cutter error has not occurred.

In step SF2, the analyzer 203 selects each printer status information entry contained in the status data D2 for processing, and based on the processed printer status information updates the matching record in the status data database 211.

By the process of step SF2, each record in the status data database 211 contains the updated information based on the most recently received printer status information.

The process of the communication interval calculator 204 updating the communication interval file 212 is described next.

As described above, multiple agent terminals 11 are connected to the maintenance server 7, and the number of agent terminals 11 connected to the maintenance server 7 may increase to the maximum number allowed by the scale of the network system 1 (more than 1000 terminals, for example). If response requests (status data D2) are transmitted from agent terminals 11 concentrated within a short period of time, the processing load on the maintenance server 7 increases, and processing by the maintenance server 7 may be delayed.

As a result, the communication interval calculator 204 calculates a communication interval of an appropriate value by the process described below to reduce the chance of a high concentration of response requests being sent from multiple agent terminals 11 in a short period of time, and thereby suppress increasing the processing load on the maintenance server 7.

Figure 9:
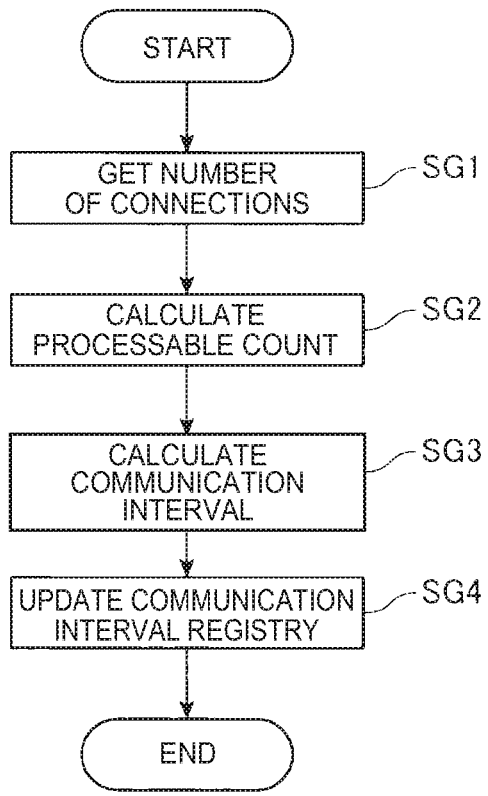
FIG. 9 is an operational flow chart of a management server.

FIG. 9 is a flow chart of the operation of the communication interval calculator 204 when updating the communication interval file 212.

The communication interval calculator 204 executes the process of the flow chart in FIG. 9 at a specific interval.

As shown in FIG. 9, the communication interval calculator 204 acquires the number of agent terminals 11 connected to the maintenance server 7 (step SG1). The communication interval calculator 204 manages the number of communication paths (HTTP sessions over a TCP connection in this example) established with agent terminals 11, and acquires the number of agent terminals 11 connected to the maintenance server 7 based on the number of communication paths. The number of agent terminals 11 connected to the maintenance server 7 is referred to below as the number of connected terminals.

Next, the communication interval calculator 204 calculates a processable count (step SG2).

The processable count is the number of status data D2 objects the maintenance server 7 can process per second, which is a unit time in this example, when usage of the CPU of the maintenance server 7 or other controller (referred to below as simply CPU) is maximized (i.e. brought to its maximum CPU usage, or maximum level).

Note that the maximum CPU usage is the maximum number of status data D2 processes and associated processes that the maintenance server 7 can execute without delay, and if CPU usage exceeds this maximum level, processing by the maintenance server 7 may be delayed. CPU usage should not exceed its maximum level when processing status data D2, and as will be understood from the below explanation, the communication interval is a value at which CPU usage can be prevented from exceeding its maximum level.

In step SG2 the communication interval calculator 204 acquires the amount of data in the status data D2. The communication interval calculator 204 has a function for calculating the average amount of data (size) in the status data D2 received during a specific time period preceding the present/current time, and acquires the average data size calculated by the function based on the amount of data in the status data D2. Note that the size of the status data D2 may be a defined constant based on previous tests or simulations. Next, the communication interval calculator 204 calculates the time required to process the status data D2 based on the acquired amount of data in the status data D2. Processing status data D2 included processing by the response unit 202, processing by the analyzer 203, and other processes executed based on the status data D2. The size of the status data D2 has a positive correlation to the time required to process the status data D2, and a table storing the relationship between the amount of data and the required time is previously stored in the maintenance server 7. The method of calculating the time required to process the status data D2 is not limited to this method, and other desirably methods may be used.

Next, the communication interval calculator 204, based on the calculated time required for status data D2 processing, calculates the number of status data D2 objects the maintenance server 7 can process per unit time (calculates the processable count).

After calculating the number of connected terminals in step SG1, and the processable count in step SG2, the communication interval calculator 204 calculates the communication interval by the following equation 1 (step SG3).

communication interval=number of connected terminals/processable count   Equation 1:

When status data D2 is sent by multiple agent terminals 11 connected to the maintenance server 7 at the interval indicated by the communication interval calculated as described above, the maintenance server 7 can process the multiple received status data D2 objects without CPU usage exceeding the maximum.

Note that the method of calculating the communication interval described above is simplified for brevity, and the communication interval may obviously be calculated to reflect various sorts of margins.

The method of calculating the communication interval is also not limited to the foregoing. More specifically, because the communication interval is calculated to suppress increasing the processing load of the maintenance server 7, it may be calculated by any method based on factors that affect the processing load of the maintenance server 7. Factors affecting the processing load of the maintenance server 7 in this example include the number of agent terminals 11 connected to the maintenance server 7, the processing capacity of the maintenance server 7, the status data D2 (the amount of data received as a response request from the agent terminals 11), and the time required to process the status data D2, but are not limited thereto.

After calculating the communication interval in step SG3, the communication interval calculator 204 updates the communication interval file 212 by overwriting the value of the communication interval information recorded in the communication interval file 212 with the newly calculated communication interval (step SG4).

Operation of the maintenance server 7 when providing information useful for printer 9 maintenance to the maintenance technician (as described above, the person responsible for maintaining printers 9 in the store system 3) is described next.

Note that below the maintenance technician is located in the head office and uses the head office terminal 5.

The maintenance technician needing to acquire information related a specific printer 9 starts a browser on the head office terminal 5 and accesses a specific URL on a predetermined maintenance server 7.

When this specific URL is accessed, the information provider 205 of the maintenance server 7 generates and sends an HTML file for displaying a printer ID input screen G101 (FIG. 10) to the head office terminal 5.

The home office terminal controller 30 of the head office terminal 5 receives the HTML file through a function of the browser, and controls the home office terminal display unit 33 based on the received HTML file to display the printer ID input screen G101 on the display panel.

Figure 10:
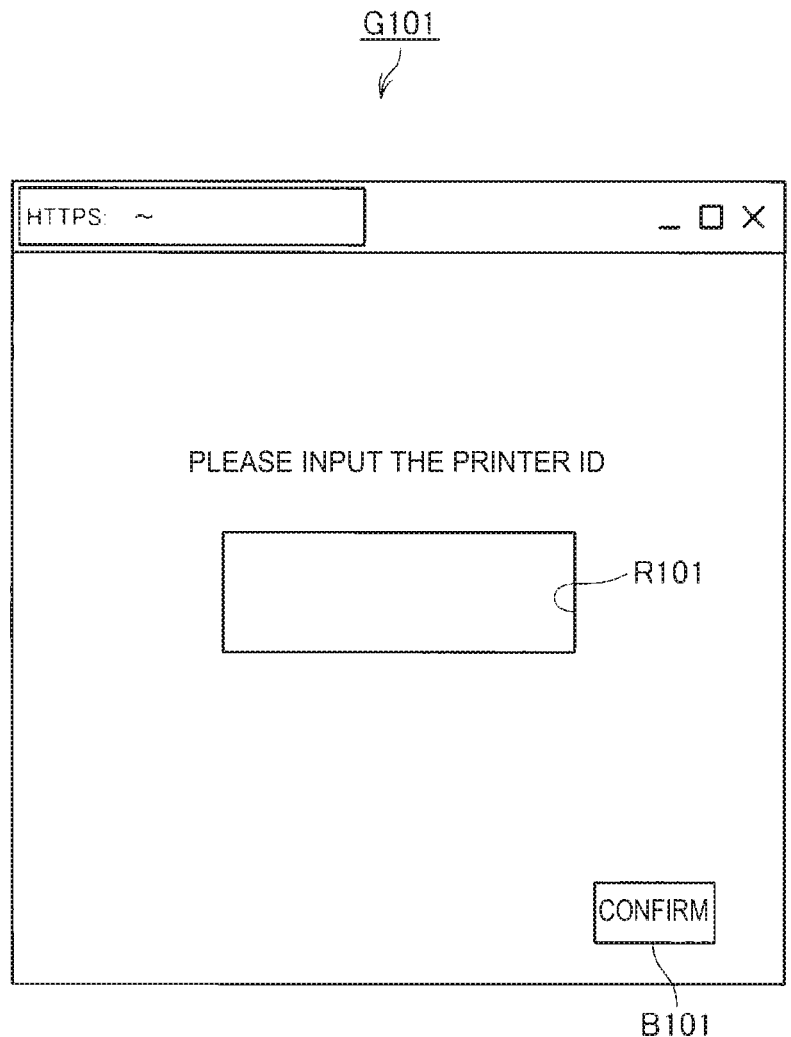
FIG. 10 shows an example of a printer ID input screen.

FIG. 10 shows an example of a printer ID input screen G101.

FIG. 10, the printer ID input screen G101 has an input field R101 for inputting printer ID. The maintenance technician inputs the printer ID of the printer 9 for which information is to be acquired, and operates the Enter button B101 to confirm the input. When input is confirmed, the input printer ID is transmitted to the maintenance server 7 by a function of a script embedded in the HTML file.

The information provider 205 of the maintenance server 7 then receives the printer ID. Next, the information provider 205 finds the corresponding record in the status data database 211 based on the received printer ID. The corresponding record is the record storing printer ID of the same value as the received printer ID. Next, the information provider 205 generates and sends to the head office terminal 5 an HTML file for displaying an information screen G111 (FIG. 11) based on the located record.

The home office terminal controller 30 of the head office terminal 5 receives the HTML file by a function of the browser, and controls the home office terminal display unit 33 based on the received HTML file to display the information screen G111 on the display panel.

Figure 11:
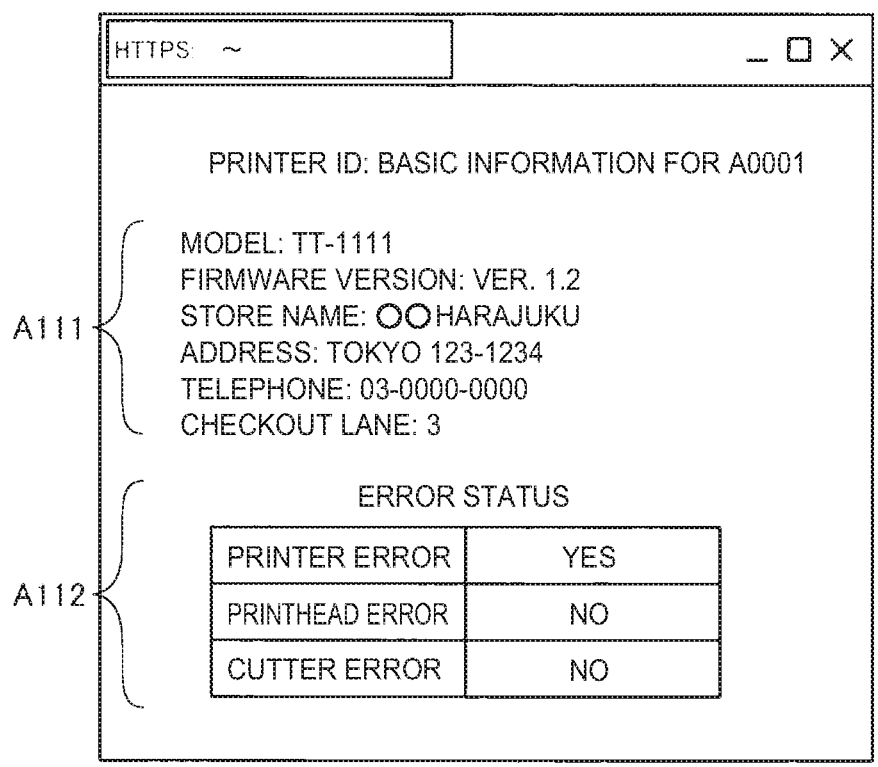
FIG. 11 shows an example of an information screen.

FIG. 11 shows an example of an information screen G111.

As shown in FIG. 11, the information screen G111 has a field A111 and a field A112. Basic information related to the printer 9 of the printer ID input by the maintenance technician is displayed in field A111. In the example in FIG. 11, the basic information related to the printer 9 includes information indicating the model of the printer 9, information indicating the version of firmware installed in the printer 9, information indicating the name of the store where the printer 9 is used, information indicating the address of the store, information indicating the telephone number of the store, and information indicating the lane number of the checkout counter where the printer 9 is installed. The basic information related to the printer 9 is not limited to the foregoing.

A database relationally storing printer ID and basic information about the corresponding printer for each printer is stored in the maintenance server storage unit 21 of the maintenance server 7. The information provider 205 acquires the basic information about the printer from the database.

The maintenance technician can obtain the basic information about the printer by referencing the information displayed in field A111 of the information screen G111, and can call the store, for example, as needed.

As shown in FIG. 11, information indicating if a printer error occurred, information indicating if a printhead error occurred, and information indicating if a cutter error occurred are displayed in field A112.

By reading the information displayed in field A112, the maintenance technician can know whether or not a printer error, printhead error, or cutter error occurred, and based thereon can take appropriate action. If an error occurred, such appropriate action may include, for example, reporting the error, and what action to take to resolve the error, to the responsible (designated) person in the store.

Another process of the agent terminal 11 is described next.

This process addresses the following problem in the network system 1.

As described above, a store system 3 may have multiple agent terminals 11. For example, if the store system 3 has 1000 printers 9, and each of the agent terminals 11 is configured to manage 10 printers 9 (each agent terminal 11 sends status-related information to the maintenance server 7), there would be 100 agent terminals 11 in the store system 3.

Each of the agent terminals 11 in each store system 3 also turns on and starts up at once when the store opens. For example, when the store opens, power is supplied at once to all agent terminals 11 by a specific means, and each agent terminal 11 boots up when power is supplied. As described below, when it boots, each agent terminal 11 is configured to send information indicating it booted together with other information to the maintenance server 7. As a result, when multiple agent terminals 11 boot at the same time when the store opens, it is necessary to suppress concentrated access to the maintenance server 7 in order to suppress network congestion and increasing the processing load on the maintenance server 7.

Communication on the network system 1 between the agent terminal 11 and maintenance server 7 may also resume after being temporarily disabled due, for example, to a communication error on the global network GN, a communication error in the store system 3, or other reason. As described below, because the agent terminal 11 is configured to send to the maintenance server 7 data including information indicating that the agent terminal 11 booted when communication with the maintenance server 7 resumes (when communication resumes), there is a need to suppress concentrated access to the maintenance server 7 in order to suppress network congestion and increasing the processing load of the maintenance server 7 when communication resumes.

The agent terminal 11 therefore executes the following process.

Figure 12:
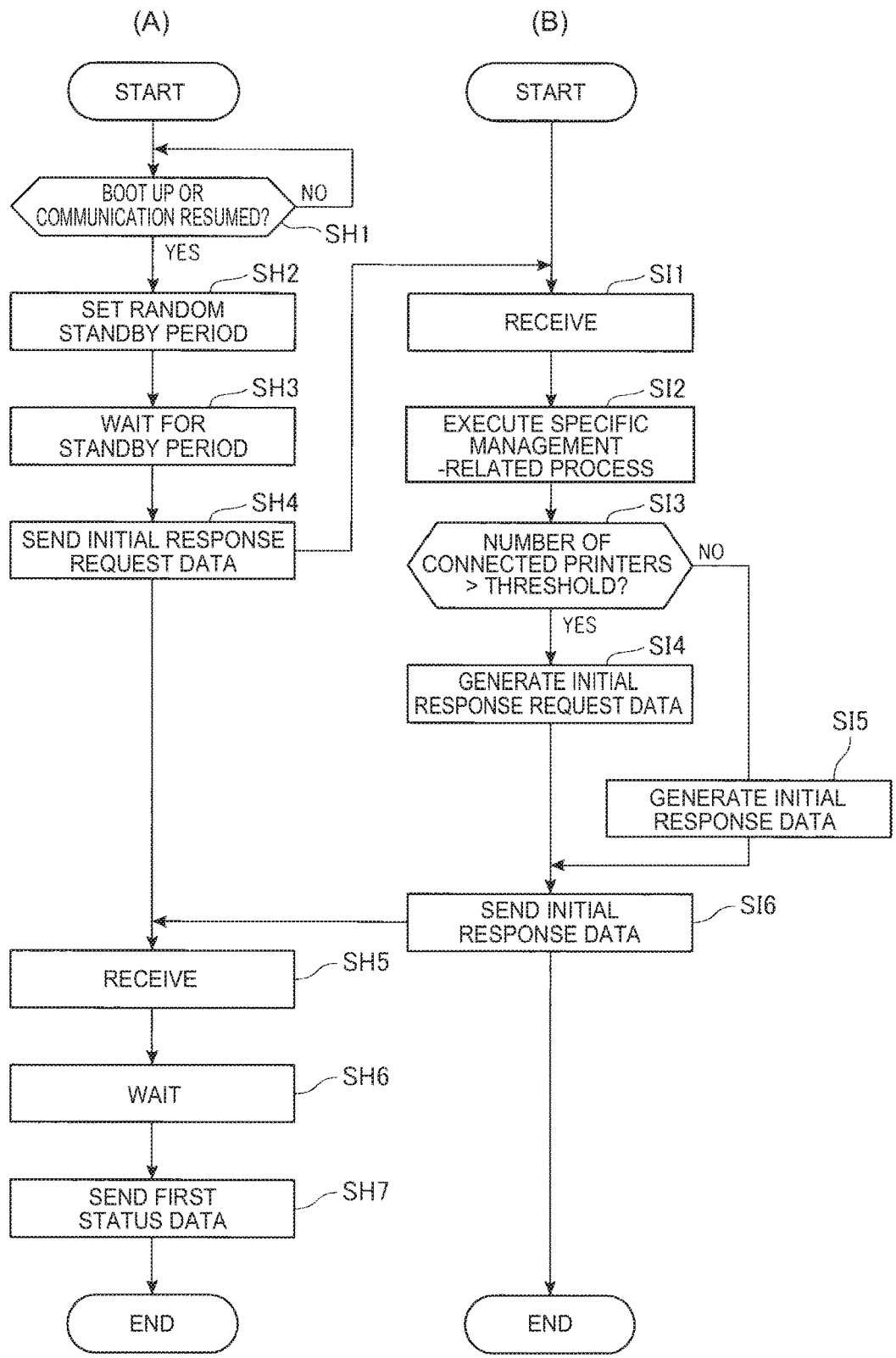
FIG. 12 is an operational flow chart of an agent terminal and the management server.

The operation of the agent terminal 11 is shown in column (A) of FIG. 12, and the operation of the maintenance server 7 is shown in column (B) of FIG. 12.

The agent terminal 11 has a process execution unit (a process executor) (not shown in the figure) corresponding to the agent terminal controller 60 (FIG. 3), and this corresponding process execution unit executes the operation of the flow chart shown in column (A). The maintenance server 7 has a management unit (a manager) (not shown in the figure) in the maintenance server controller 20 (FIG. 2), and the management unit executes the steps in the flow chart in column (B).

As shown in column (A) of FIG. 12, the corresponding process execution unit of the agent terminal 11 monitors if the agent terminal 11 is booting up or if communication has resumed (step SH1).

In step SH1 the corresponding process execution unit determines the agent terminal 11 is booting up if the agent terminal 11 power turned on and a specific program embodying the function of the corresponding process execution unit booted because the power turned on. The corresponding process execution unit also has a function for detecting if communication resumed after communication with the maintenance server 7 was disabled. This function may be embodied by any desirable means.

At booting up and when communication resumes, the corresponding process execution unit randomly sets a standby period (step SH2).

More specifically, the standby period is the time to wait to start sending the initial response request data described below. The corresponding process execution unit has a function for randomly generating the value of a standby period that is shorter (less than) a specific maximum (such as 1 minute), and randomly setting the standby period.

Next, the corresponding process execution unit waits for the randomly set standby period to pass (step SH3), and then sends the initial response request data to the maintenance server 7 (step SH4).

When booting up, the initial response request data is data including at least information indicating that the agent terminal 11 started, and information indicating the number of printers 9 connected to the agent terminal 11. Note that a printer 9 connected to the agent terminal 11 means a printer 9 that is managed by the agent terminal 11 (is an object that sends status-related information to the maintenance server 7).

When communication resumes, the initial response request data is data including at least information indicating that the agent terminal 11 was started and information indicating the number of printers 9 connected to the agent terminal 11.

The process of the agent terminal 11 transmitting initial response request data in step SH4 is an example of a process whereby the client transmits a response request when booting up or when communication resumes.

As described above, the agent terminal 11 in this embodiment waits for a randomly set standby period after booting up or when communication resumes, and then sends initial response request data. The effect of this is described below.

If the agent terminal 11 is configured to transmit initial response request data immediately after booting or communication resumes without waiting for a randomly set standby period, multiple agent terminals 11 will send initial response request data during the same time period. Access to the maintenance server 7 by the multiple agent terminals 11 will therefore be concentrated in a short time, and may result in network congestion and an increased processing load on the maintenance server 7.

However, by each agent terminal 11 waiting for a randomly set standby period after booting up or when communication resumes before sending the initial response request data, the multiple agent terminals 11 will transmit the initial response request data at different times and access to the maintenance server 7 can be prevented from being concentrated.

As shown in column (B) of FIG. 12, the management unit of the maintenance server 7 receives the initial response request data (step SI1).

Next, the management unit executes a specific process related to agent terminal 11 management based on the initial response request data (step SI2). While not described in detail, the maintenance server 7 has a function for managing whether or not a particular agent terminal 11 has booted. In step SI2, the management unit recognizes based on the initial response request data that the agent terminal 11 that transmitted the initial response request data has booted, and manages that agent terminal 11 as a terminal that has booted. While not described in detail, the agent terminal 11 has a function for transmitting to the maintenance server 7 information indicating that the power was turned off when a power off command is asserted, and based on this data the maintenance server 7 knows that the power of that agent terminal 11 turned off. The maintenance server 7 reports by a specific means to the maintenance technician whether the specific agent terminal 11 specified by the maintenance technician has booted.

Next, the management unit determines, based on the information contained in the initial response request data indicating the number of printers 9 connected to the agent terminal 11, if the number of printers 9 connected to the agent terminal 11 exceeds a specific threshold (step SI3).

If the specific threshold is exceeded (step SI3: YES), the management unit generates initial response data including information instructing changing the timing for transmitting the next status data D2 from the timing at which the initial response request data was transmitted to a time after period KK1 has past (step SI4).

This period KK1 is a period offset a randomly set value (referred to below as a margin) from the period corresponding to the interval set in the transmission interval registry 611. For example, if the period corresponding to the interval set in the transmission interval registry 611 is 10 minutes and the margin is +5 minutes, period KK1 is 15 minutes.

In step SI4, the management unit sets a random margin by a specific means, and generates initial response data including at least information indicating the set margin.

After step SI4, the management unit goes to step SI6.

If the specific threshold is not exceeded (step SI3: NO), the management unit generates initial response data including information instructing setting the timing for transmitting the next status data D2 from the timing at which the initial response request data was transmitted to a time at which the interval set in the transmission interval registry 611 has past (step SI5). After step SI5, the management unit goes to step SI6.

In step SI6, the management unit sends the initial response data generated in step SI4 or SI5 to the agent terminal 11.

As shown in column (A) of FIG. 12, the corresponding process execution unit of the agent terminal 11 then receives the initial response data (step SH5).

Next, the corresponding process execution unit waits until the time specified by the information contained in the received initial response data passes (step SH6). More specifically, when the initial response data generated in step SI4 is received, the corresponding process execution unit waits for period KK1 to pass after transmitting the initial response request data. In this event, the corresponding process execution unit references the transmission interval registry 611 and calculates the period KK1 by adding the margin to the period corresponding to the interval specified in the file. When the initial response data generated in step SI5 is received, the corresponding process execution unit transmits the initial response request data and then waits for the period print image data in the transmission interval registry 611 to pass.

Next, the corresponding process execution unit informs the status data generator 601 that the time to generate the status data D2 came (step SH7). Based on this report, the status data generator 601 generates and sends status data D2 to the maintenance server 7. The status data generator 601 generates and sends the status data D2 at the specific interval by the method described using FIG. 4 and FIG. 5.

The timing at which the multiple agent terminals 11 that simultaneously booted or resumed communication send the initial response request data and then send status data D2 the first time is described next.

Figure 13:
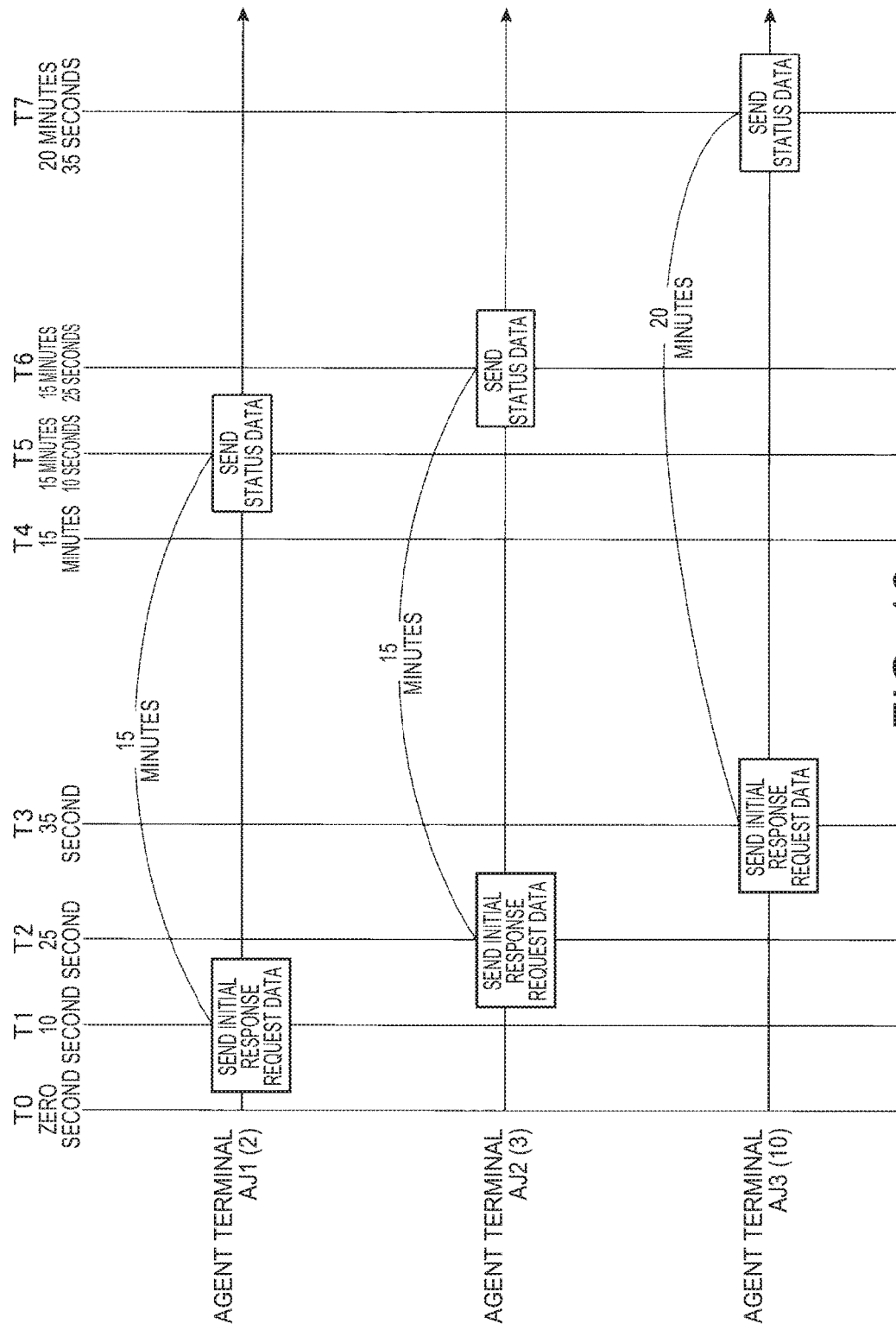
FIG. 13 is a timing diagram showing the process timing of plural agent terminals.

FIG. 13 illustrates the timing at which three agent terminals (agent terminal AJ1, agent terminal AJ2, agent terminal AJ3) deployed in the same store system 3 send the initial response request data at boot up or when communication resumes and send status data D2 the first time after sending the initial response request data.

In the description referring to FIG. 13, the upper limit of the randomly set standby period is 1 minute, the standby period of agent terminal AJ1 is 10 seconds, the standby period of agent terminal AJ2 is 25 seconds, and the standby period of agent terminal AJ3 is 35 seconds.

The number of printers 9 connected to agent terminal AJ1 is 2, the number of printers 9 connected to agent terminal AJ2 is 3, and the number of printers 9 connected to agent terminal AJ3 is 20. The specific threshold used by the management unit of the maintenance server 7 in step SI3 is 10. In this event, in step SI3 the management unit determines that the number of printers 9 connected to agent terminals AJ1 and AJ2 do not exceed the specific threshold of connected printers, but the management unit determines that the number of connected printers 9 for agent terminal AJ3 does exceed the specific threshold.

In step SI4, the margin randomly set by the management unit is +5 minutes. The value of the interval specified in the transmission interval registry 611 for agent terminal AJ1, agent terminal AJ2, and agent terminal AJ3 is 15 minutes.

As shown in FIG. 13, agent terminal AJ1 transmits the initial response request data at time T1 when 10 seconds (its standby period) have elapsed from time T0, which is a specific reference time such as at boot up or when communication resumes. Agent terminal AJ2 transmits the initial response request data at time T2 when 25 seconds (its standby period) have past from its reference time T0. Agent terminal AJ3 transmits its initial response request data at time T3 when 35 seconds (its standby period) have past from its reference time T0.

Because the length of the standby period is set randomly on each agent terminal 11, the timing at which each agent terminal 11 transmits the initial response request data is offset by an amount less than a preset maximum. As a result, concentrated access to the maintenance server 7 can be alleviated (avoided or mitigated).

Note that a maximum is set for the standby period to prevent an excessive delay in the timing for sending the initial response request data at boot up or when communication resumes.

Because the number of connected printers 9 is less than the specified maximum number for agent terminal AJ1, an (extra or additional) margin set by the maintenance server 7 is not added to the timing for sending the first status data D2. Agent terminal AJ1 therefore sends the first status data D2 at time T5, that is, when 15 minutes (the interval set in the transmission interval registry 611) have past from its time T1, which is the time when it sent its initial response request data.

Likewise, because the number of connected printers 9 for agent terminal AJ2 is also less than the specified maximum number of connected printers, the (extra or additional) margin set by the maintenance server 7 is not added to the timing for sending the first status data D2. Agent terminal AJ2 therefore sends its first status data D2 at time T6, that is, when 15 minutes (the interval set in the transmission interval registry 611) have past from its time T2 (i.e. time when AJ2 sent its initial response request data).

However, because the number of connected printers 9 for agent terminal AJ3 exceeds the specified maximum of connected printer, the (extra) margin (5 minutes) set by the maintenance server 7 is added to the timing for sending the first status data D2. Agent terminal AJ3 therefore sends the first status data D2 at time T7, that is, when 20 minutes (the interval set in the transmission interval registry 611 plus the margin) have elapsed from its time T3 (i.e. the time when AJ3 sent its initial response request data).

After transmitting their respective first status data D2, agent terminals AJ1, AJ2, AJ3 each transmit subsequent status data D2 every 15 minutes (at 15 minute intervals).

As described above, agent terminal AJ3 transmits status data D2 at a time offset from the timing when agent terminal AJ1 and agent terminal AJ2 transmit the status data D2.

As described above, the timing for transmitting status data D2 the first time by an agent terminal 11 that is connected to more than a specific number of printers 9 is offset by a specific (extra or additional) margin in addition to the interval defined in the transmission interval registry 611. The objective of this is described below.

As described above, printer status information (FIG. 7) for each printer 9 connected to one agent terminal 11 (a printer 9 managed by that one agent terminal 11) is contained in the status data D2 the one agent terminal 11 transmits. The greater the number of printers 9 connected to the agent terminal 11, the larger the status data D2 the agent terminal 11 transmits becomes. By shifting the timing when an agent terminal 11 connected to more than a specific number of printers 9 transmits status data D2 from the timing other agent terminals 11 transmit the status data D2, the timing for transmitting status data D2 containing a large amount of information can be offset particularly from the timing when status data D2 is transmitted by other terminals. As a result, network congestion can be efficiently and effectively suppressed, and increasing the processing load of the maintenance server 7 can be suppressed.

The margin is set to an appropriate value to achieve the foregoing objective. For example, the margin is appropriately approximately ½ the interval specified in the transmission interval registry 611.

The management unit of the maintenance server 7 in this first embodiment of the invention compares the number of printers 9 connected to the agent terminal 11 in step SI2 with a specific value. The management unit may alternatively be configured to manage by a specific means the amount of data in the status data D2 transmitted by an agent terminal 11 (for example, the average amount of data in the status data D2 transmitted by an agent terminal 11 during a specific past period of time), and compare this amount of data with a specific threshold.

The operation of the POS terminal 8 and printer 9 when processing a transaction at a checkout counter in a store is described next.

Figure 14:
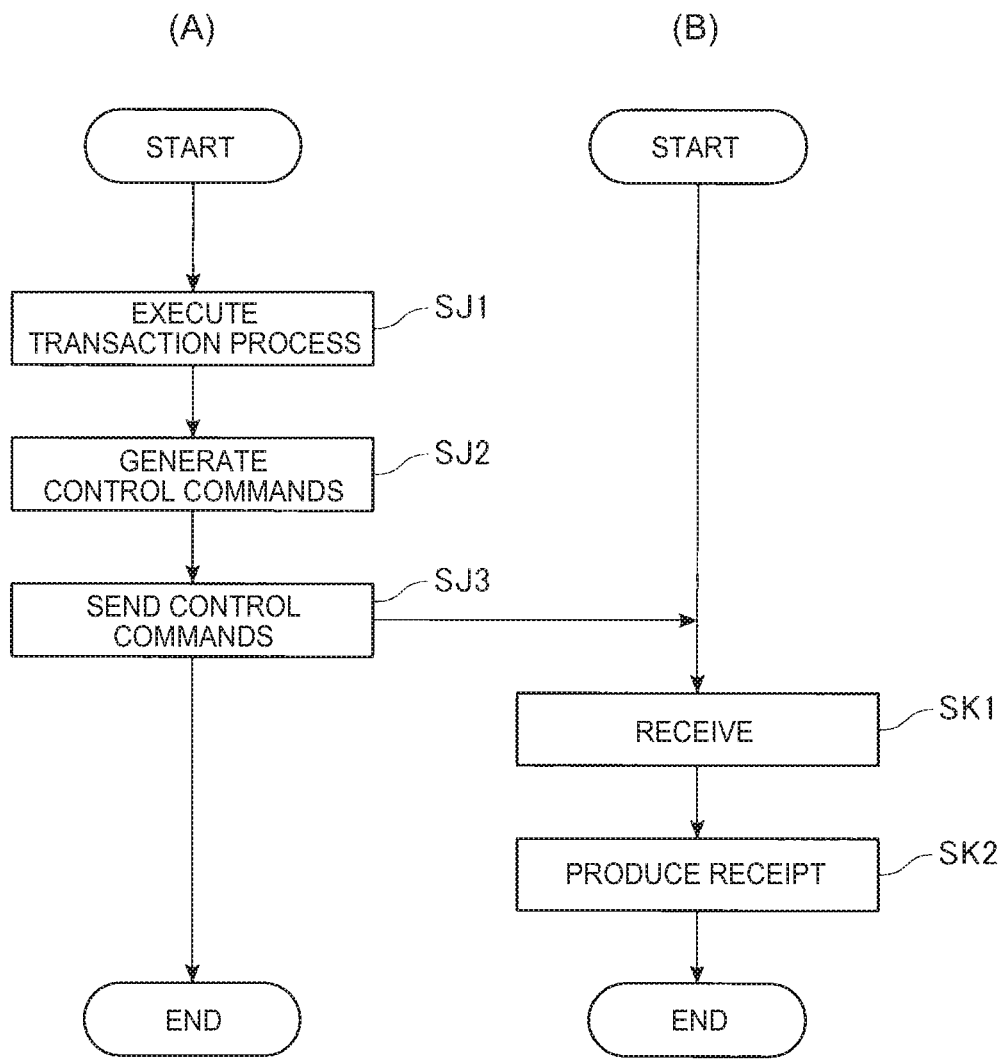
FIG. 14 is an operational flow chart of a printer and POS terminal.

FIG. 14 is a flow chart showing the operation of the POS terminal 8 and printer 9 during a transaction process, column (A) of FIG. 14 showing the operation of the POS terminal 8 and column (B) of FIG. 14 showing the operation of the printer 9.

As shown in column (A) of FIG. 14, the POS terminal controller 70 of the POS terminal 8 executes a transaction process according to the customer transaction (step SJ1).

In the transaction process, the checkout clerk reads the barcode of a product purchased by the customer with the barcode scanner BS. Based on the read result from the barcode scanner BS, the POS terminal controller 70 acquires the product code of the product, references the product master 511 of the POS server 10, and acquires the product price and other product-related information required by the transaction process. Based on the acquired product-related information, the POS terminal controller 70 displays product-related information on the customer display CD and the clerk's display DP. Based on the acquired product-related information, the POS terminal controller 70 also calculates the transaction amount and change due, confirms the transaction, displays information indicating the calculated amounts on the customer display CD and the clerk's display DP, and controls the cash drawer KS. After the transaction is confirmed, the POS terminal controller 70 sends transaction-related information to the POS server 10. The POS server 10 receives and registers the transaction-related information in a transaction information management database 512.

After executing the transaction process in step SJ1, the POS terminal controller 70 generates control commands causing the printer 9 to produce a receipt printed with transaction-related information (such as product-related information, information about the transaction total, and information about the change due) based on the transaction process. A POS application and printer driver are installed on the POS terminal 8, and the POS terminal controller 70 uses functions of these programs to generate the control commands.

Next, the POS terminal controller 70 controls the POS terminal communication unit 72 to send the generated control commands to the printer 9 (step SJ3).

As shown in column (B) of FIG. 14, the print controller 403 of the printer controller 40 of the printer 9 controls the printer communication unit 43 to receive the control commands (step SK1).

Next, the print controller 403 controls the printing device print unit 41 to produce a receipt based on the received control commands (step SK2). The receipt is then given by the checkout clerk to the customer.

As described above, the network system 1 according to this embodiment is a system having agent terminals 11 (clients) that are connected to a printer 9 (processing device) and transmit response requests (status data D2) at a specific interval, and a maintenance server 7 (server) that sends a response to the agent terminal 11 based on the response request received from the agent terminal 11, connected over a network.

The maintenance server 7 calculates a communication interval indicating the interval at which the agent terminals 11 transmit response requests based on factors affecting communication with the agent terminals 11, and sends communication interval information indicating the calculated communication interval to the agent terminals 11. The agent terminals 11 transmit response requests at the interval corresponding to the interval indicated by the communication interval information received from the maintenance server 7 (server).

Because the agent terminal 11 transmits response requests to the maintenance server 7 at the interval indicated by a communication interval calculated based on factors affecting the processing load on the maintenance server 7, a high concentration of response requests (status data D2) being sent in a short time from the agent terminal 11 to the maintenance server 7 can be prevented. As a result, the processing load of the maintenance server 7 increasing due to a high concentration of response requests being sent in a short time, and a delay in processing by the maintenance server 7, can be suppressed.

The agent terminal 11 in the first embodiment of the invention receives processing device status information data D1 (processing device status information) related to the status of the printer 9 from a connected printer 9, and sends status data D2 including the received processing device status information data D1 as a response request to the maintenance server 7 at the interval corresponding to the interval indicated by the communication interval information.

This configuration enables the agent terminal 11 to report the status of the printer 9 to the maintenance server 7 at a regular interval while suppressing the processing load of the maintenance server 7 from increasing due to status data D2 being transmitted at a high concentration in a short time.

The communication interval calculator 204 of the maintenance server 7 in the first embodiment calculates the communication interval to reflect, as a factor affecting the processing load of the maintenance server 7, the number of agent terminals 11 connected to the maintenance server 7.

This configuration enables calculating a communication interval of an appropriate value considering a characteristic of the network system 1, that is, the number of agent terminals 11 connected to the maintenance server 7.

The communication interval calculator 204 of the maintenance server 7 in the first embodiment also calculates the communication interval to reflect the processing capacity of the maintenance server 7, the amount of data in the status data D2, and the time required to process the status data D2.

This configuration enables calculating a communication interval of an appropriate value reflecting specific factors affecting the processing load of the maintenance server 7.

Note that the communication interval is calculated in the first embodiment to reflect the processing capacity of the maintenance server 7, the amount of data in the status data D2, and the time required to process the status data D2, but a communication interval of an appropriate value reflecting factors affecting the processing load of the maintenance server 7 can be calculated if the communication interval is calculated to reflect any one of these factors.

The maintenance server 7 in the first embodiment has a communication interval calculator 204 that calculates a communication interval indicating the interval at which an agent terminal 11 transmits response requests based on factors affecting communication with the agent terminal 11. The agent terminal 11 also has an interval updater 602 that updates the interval for transmitting response requests based on the interval indicated by the communication interval information.

This configuration uses functions of the communication interval calculator 204 of the maintenance server 7 and the interval updater 602 of the agent terminal 11 to suppress increasing the processing load of the maintenance server 7 and delayed processing by the maintenance server 7 due to a high concentration of response requests in a short time.

The agent terminals 11 in the first embodiment send initial response request data (response requests) after booting up or when communication with the maintenance server 7 is restored, and when sending the initial response request data after booting up or when communication is restored, transmit the initial response request data after waiting for a specific randomly set time.

This configuration creates a delay in transmission by multiple agent terminals 11 of initial response request data after booting up or when communication is restored when multiple agent terminals 11 boot up or resume communication simultaneously, and can prevent access by multiple agent terminals 11 to the maintenance server 7 being concentrated at the same time.

When one agent terminal 11 boots or resumes communication in the first embodiment, the maintenance server 7 sends to the one agent terminal 11 initial response data (response) including information specifying the timing for the one agent terminal 11 to send the next status data D2. More specifically, when the initial response request data sent by the one agent terminal 11 is received, the maintenance server 7 sends initial response data (a response) to create an offset between the timing that the one agent terminal 11 sends status data D2 at a specific interval, and the timing that another agent terminal 11 sends status data D2 at a specific interval. After sending the status data D2 at the timing specified by the maintenance server 7, the first agent terminal 11 continues sending status data D2 at the specific interval.

This configuration can desirably offset the intervals at which multiple agent terminals 11 transmit status data D2 by a function of the maintenance server 7, and can more effectively suppress the agent terminals 11 from accessing the maintenance server 7 at the same time.

One or more printers 9 (processing devices) can connect to the agent terminal 11 in the first embodiment, and the agent terminal 11 sends status data D2 containing information related to the status of the connected printers 9 as a response request to the maintenance server 7. The maintenance server 7 specifies the timing for agent terminals 11 that are connected to more than a specified number of printers 9 to transmit the next status data D2 so that the value of the time difference between the timing when initial response request data (a response request) is transmitted after booting or communication resumes, and the timing when the next status data D2 (response request) is sent, is different from the value of the interval (specific interval) specified in the transmission interval registry 611.

This configuration can increase the offset between the timing when an agent terminal 11 that transmits a large amount of status data D2 and the timing when other agent terminals 11 transmit status data D2, and can more efficiently and effectively suppress access by the agent terminals 11 to the maintenance server 7 being concentrated in a short period of time.

Note that as described above the maintenance server 7 may be configured to manage by a specific means the amount of data (for example, the average amount of data in the status data D2 transmitted by a agent terminal 11 during a specific past period of time) in the status data D2 transmitted by the agent terminals 11, and compare the amount of data with a specific threshold.

Variation of Embodiment 1

Figure 15A:
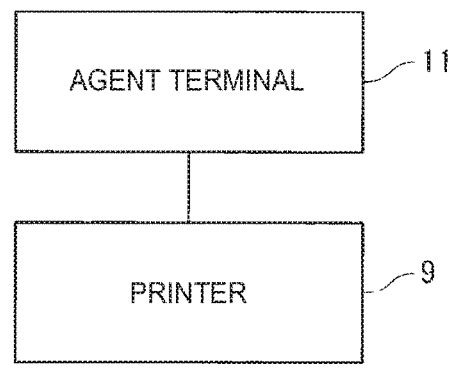
FIG. 15A illustrates a alternate embodiment in accord with the present invention.
Figure 15B:
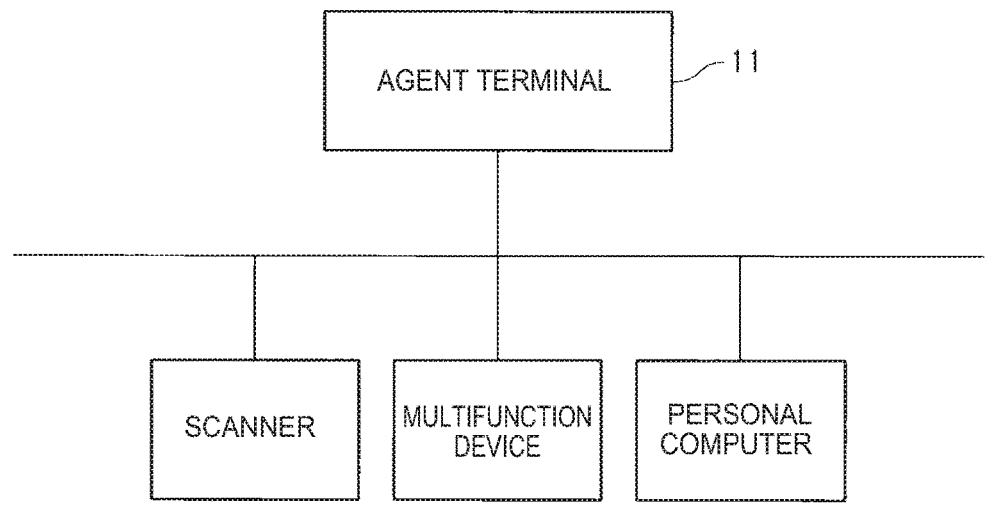
FIG. 15B illustrates another alternate embodiment in accord with the present invention.

A variation of the first embodiment is described next.
FIG. 15A and FIG. 15B are used to describe variations.

In the first embodiment the agent terminal 11 and multiple printers 9 (as examples processing devices) are connected in a one-to-many relationship through a local area network.

Communication between the agent terminal 11 and printers 9 is not limited to this method, however. For example, as shown in FIG. 15A, the agent terminal 11 and printer 9 may be configured to connect in a one-to-one relationship by USB, a communication protocol compatible with a serial communication method other than USB (such as serial communication by RS-232C), or a parallel communication protocol (such as parallel communication by IEEE-1284.

The processing device for which processing device status information related to the status of the device is sent by the agent terminal 11 to the maintenance server 7 in the first embodiment is a printer 9. However, the processing device is not limited to a device with a print capability such as the printer 9. As shown in FIG. 15B, for example, the processing device may be a scanner, a multifunction device having multiple functions such as a scanner function and a printer function, and/or a personal computer. More specifically, the processing device may be any device (or combination of devices) of which status information can be managed by a maintenance server 7 in a network system 1.

Embodiment 2

A second embodiment of the invention is described next.

The first embodiment described above is a configuration having a printer 9 connected to an agent terminal 11, and the agent terminal 11 sending status data D2 including information related to the condition of connected printers 9 to a maintenance server 7.

In this second embodiment of the invention, the printer 92 is provided with capability for accessing the global network GN, and the printer 92 communicates directly with the maintenance server 7. More specifically, the printer 92 functions as a client to the maintenance server 7 as a server in the second embodiment of the invention.

Similarly to the agent terminal 11 in the first embodiment, the printers 92 in the same store system 3 turn on and transmit initial response request data to the maintenance server 7 at the same time when the store opens for business, and transmit initial response request data at the same time when communication with the maintenance server 7 resumes.

Figure 16:
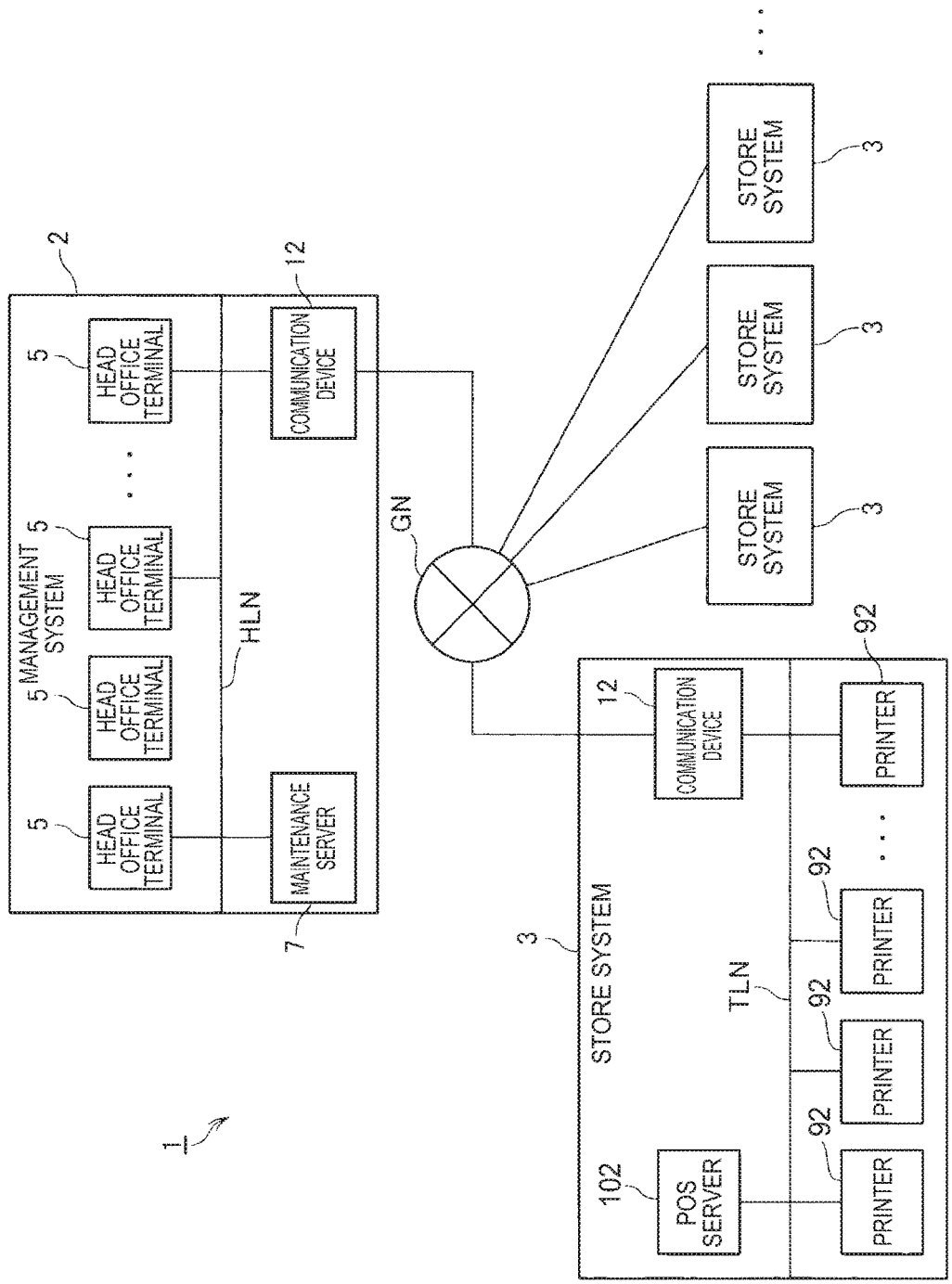
FIG. 16 illustrates a configuration of a network system according to another embodiment of the present invention.

FIG. 16 illustrates the configuration of a network system 1 according to a second embodiment of the invention. Note that like parts (similar elements) in FIG. 16 and FIG. 1 are identified by like reference numerals (have similar reference characters), and are described above. In the second embodiment as shown in FIG. 16, one or more printers 92, a POS server 102, and a communication device 12 are connected to the store-side local area network TLN in the store system 3.

Figure 17:
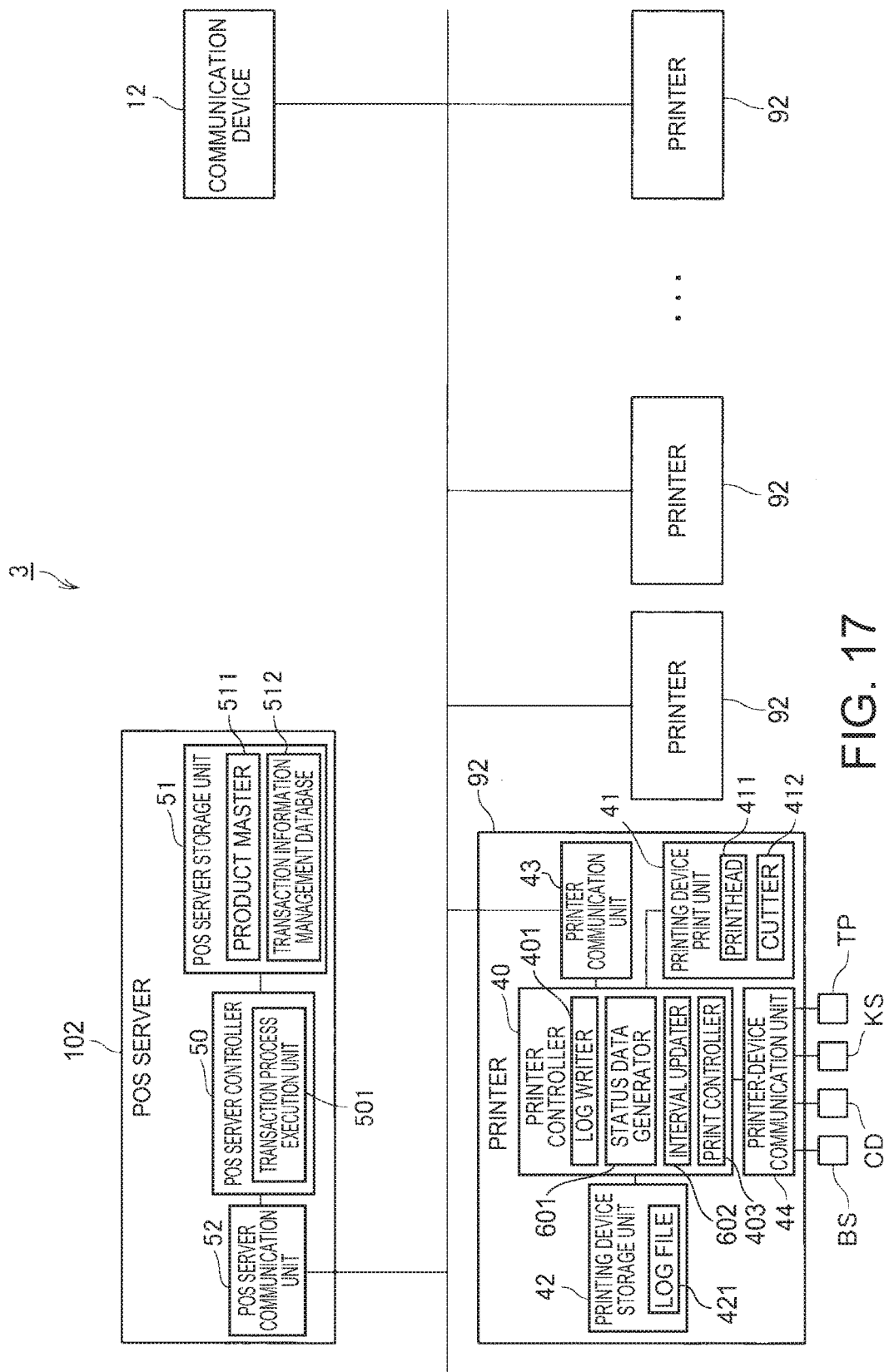
FIG. 17 is a block diagram illustrating functional configurations of devices in a store system in accord with the present invention.

FIG. 17 is a block diagram illustrating the functional configuration of the printer 92 and POS server 102 in the store system 3.

As shown in FIG. 17, each printer 92 has a printer controller (control unit), printing device print unit 41 (print unit), printing device storage unit 42, printer communication unit 43, and a printer-device communication unit 44 (printer-device communicator 44).

The printing device print unit 41, printing device storage unit 42, and printer communication unit 43 are as described in the first embodiment, and further description thereof is omitted.

The printer controller 40, which may include a CPU, ROM, RAM, and other peripheral circuits not shown, controls the printer 92.

The printer controller 40 includes a log writer 401, status data generator 601, interval updater 602, and print controller 403. These function blocks execute processes by the cooperation of hardware and software, such as a CPU reading and running a program (such as firmware, client software corresponding to the server software of the maintenance server 7). The functions and processes based on the functions of these function blocks are described further below.

The printer-device communication unit 44 has an interface board with a USB port, a port conforming to a non-USB serial communication standard, or port conforming to another communication protocol. The printer-device communication unit 44 communicates with devices connected to the port as controlled by the printer controller 40. Note that the printer-device communication unit 44 may have a wireless communication capability and be configured to communicate with devices wirelessly.

In the example shown in FIG. 17, a barcode scanner BS, customer display CD, cash drawer KS, and touch panel TP connect as peripheral devices to the printer 92.

The barcode scanner BS, customer display CD, and cash drawer KS are described above in the first embodiment, and further description thereof is omitted.

The touch panel TP is an LCD panel, OLED panel, or other type of display panel with a touch sensor for detecting touch operations by the user (such as the checkout clerk) overlaid to the display panel. The touch panel TP is disposed at the checkout counter where it can be seen and operated by touch by the checkout clerk. The touch panel TP displays information on the display panel as controlled by the printer controller 40. The printer controller 40 can display a web page on the touch panel TP based on an HTML file acquired by specific means. When a touch operation by the user is detected, the touch panel TP outputs a signal indicating the position that was touched to the printer controller 40. The printer controller 40 then executes a process corresponding to the touch operation by the user based on input from the touch panel TP.

As shown in FIG. 17, the POS server 102 includes a POS server controller 50, POS server storage unit 51 (POS server memory store, or memory storage, 51), and POS server communication unit 52 (POS server communicator, or communication interface, or network interface, or network interface controller (NIC) 52).

The POS server controller 50 includes a CPU, ROM, RAM, and other peripheral circuits not shown, and controls the POS server 102.

The POS server controller 50 has a transaction process execution unit 501 (transaction data processor 501). This function block executes processes by the cooperation of hardware and software, such as a CPU reading and running a program (such as a POS application). The functions of this function block and processes based on those functions are described further below.

The POS server storage unit 51 comprises nonvolatile storage such as a hard disk drive or an EEPROM device, and stores data.

The POS server storage unit 51 stores a product master 511. The product master 511 relationally stores product code, price, and other information about products sold in the store.

The POS server storage unit 51 stores a transaction information management database 512.

As described above, the network system 1 includes a maintenance server 7. The maintenance server 7 manages the status of printers 92 in the store system 3. The maintenance server 7 also provides information that is useful for printer 92 maintenance to the maintenance technician responsible for maintaining the printers 92 of the store system 3.

The operation of devices in the network system 1 when managing the status of the printers 92 is described next.

The printer 92 and maintenance server 7 communicate according to HTTP (Hypertext Transfer Protocol). More specifically, the printer 92 is an example of a client in a client-server system and the maintenance server 7 is a server in a client-server system. The devices communicate as described in the first embodiment, and further description thereof is omitted.

As a result, data can be sent and received between the printer 92 and maintenance server 7 by the printer 92 sending a response request and the maintenance server 7 returning a response to the response request. Data can therefore not be transmitted asynchronously from the maintenance server 7 to a specific printer 92, and data is sent from the maintenance server 7 to a specific printer 92 in the form of data transmitted as a response to a response request from the specific printer 92.

Figure 18:
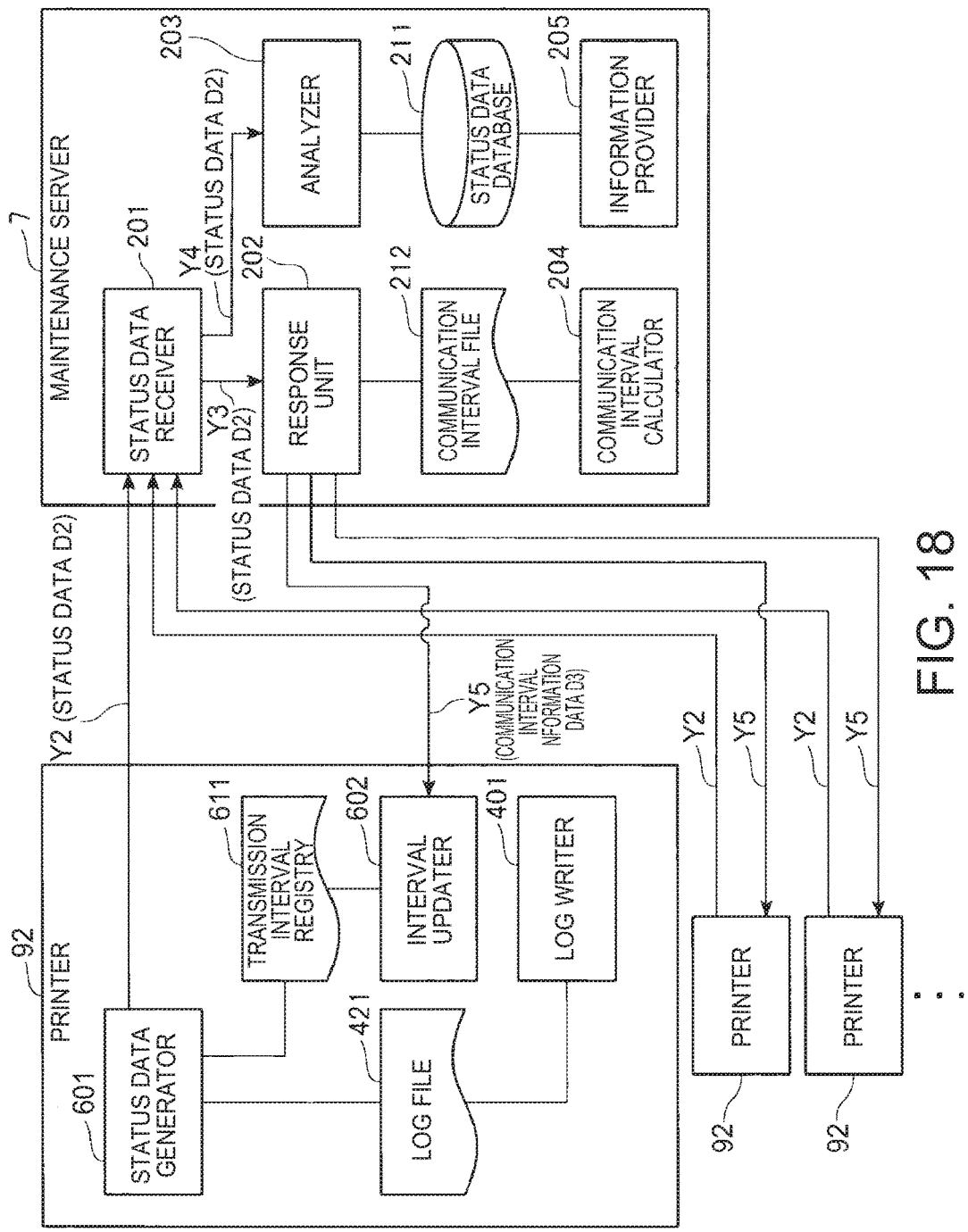
FIG. 18 illustrates data flow between devices in the network system.

FIG. 18 shows function blocks of the printer controller 40 of the printer 92, and function blocks of the maintenance server controller 20 of the maintenance server 7 together with associated data.

The basic flow of data sent and received between the function blocks of the printer 92 and maintenance server 7 for the maintenance server 7 to manage the status of a printer 92 is described with reference to FIG. 18.

Note that details about the processes of the function blocks, the content of data sent and received between the function blocks, and the information contained in the communicated data, are omitted from the following description using FIG. 18.

As shown in FIG. 18, the log writer 401 of the printer 92 writes log information to the log file 421 at specific times. The log file 421, log information and log items contained in the log information are described in the first embodiment, and further description thereof is omitted.

As shown in FIG. 18, the status data generator 601 of the printer 92 references the transmission interval registry 611 and generates status data D2 based on the log file 421 at the interval specified in the transmission interval registry 611. The status data generator 601 sends the generated status data D2 to the maintenance server 7 (arrow Y2). In other words, the status data generator 601 generates and sends the status data D2 to the maintenance server 7 at the interval indicated in the transmission interval registry 611.

The status data generator 601 sends the status data D2 to the maintenance server 7 by HTTP as a HTTP request (response request).

The status data receiver 201 of the maintenance server 7 receives the status data D2. The status data receiver 201 outputs the status data D2 to the response unit 202 (arrow Y3). The status data receiver 201 also outputs the received status data D2 to the analyzer 203 (arrow Y4).

The response unit 202 references the communication interval file 212 and generates communication interval information data D3 including communication interval information indicating the communication interval, and outputs the generated communication interval information data D3 to the printer 92 (arrow Y5). The response unit 202 sends the communication interval information data D3 to the printer 92 by HTTP as an HTTP response.

The analyzer 203 then updates the status data database 211 based on the status data D2 input from the status data receiver 201.

The communication interval calculator 204 updates the communication interval file 212 by the method described below.

When accessed from the head office terminal 5 by the method described below, the information provider 205 references the status data database 211 and provides information useful for maintaining the printer 92.

The interval updater 602 of the printer 92 receives the communication interval information data D3. The interval updater 602 updates the transmission interval registry 611 based on the communication interval information contained in the received communication interval information data D3.

The status data generator 601 then references the transmission interval registry 611, and at the interval indicated in the file generates and sends status data D2 to the maintenance server 7.

As described above, data is sent and received between the printer 92 and the maintenance server 7 through a process of the printer 92 intermittently sending status data D2 to the maintenance server 7, and the maintenance server 7 sending communication interval information data D3 to the printer 92.

The operation of the printer 92 and maintenance server 7 when managing the status of the printer 92 is described next.

Figure 19:
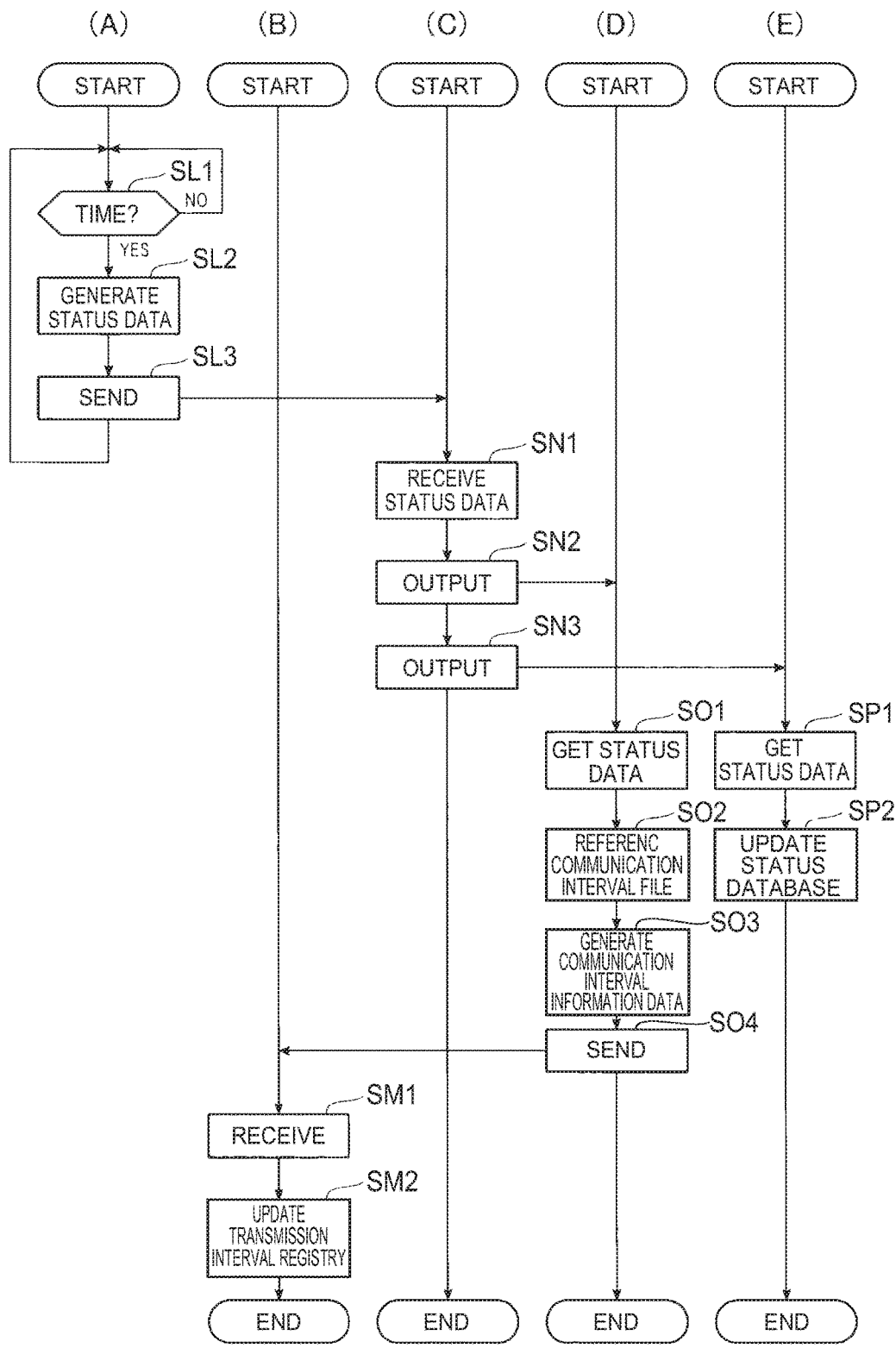
FIG. 19 is an operational flow chart of devices in the network system.

FIG. 19 is a flow chart of the operation of the printer 92 and maintenance server 7.

Column (A) of FIG. 19 shows the operation of the status data generator 601 of the printer 92, column (B) of FIG. 19 shows the operation of the interval updater 602 of the printer 92, column (C) of FIG. 19 shows the operation of the status data receiver 201 of the maintenance server 7, column (D) of FIG. 19 shows the operation of the response unit 202 of the maintenance server 7, and column (E) of FIG. 19 shows the operation of the analyzer 203 of the maintenance server 7.

As shown in column (A) of FIG. 19, the status data generator 601 of the printer 92 the status data generator 601 references the transmission interval registry 611 and monitors if the timing for generating the status data D2 has come (step SL1).

The transmission interval registry 611 is a file storing information indicating the interval for generating and transmitting status data D2. In step SL1, the status data generator 601 references the transmission interval registry 611, and determines it is time to generate status data D2 if the interval (period) set in the transmission interval registry 611 has past since the last time the status data D2 was generated and sent.

If the time for generating status data D2 has come (step SL1: YES), the status data generator 601 references the log file 421 and generates processing device status information data D1 (FIG. 6) based on the log information recorded in the log file 421, and generates status data D2 based on the processing device status information data D1 that was generated (step SL2).

The status data D2 is text data (such as XML (eXtensible Markup Language data) storing information in a hierarchical structure using a combination of hierarchical keys and values, and is data that can be transmitted to the maintenance server 7 as a request.

Figure 20:
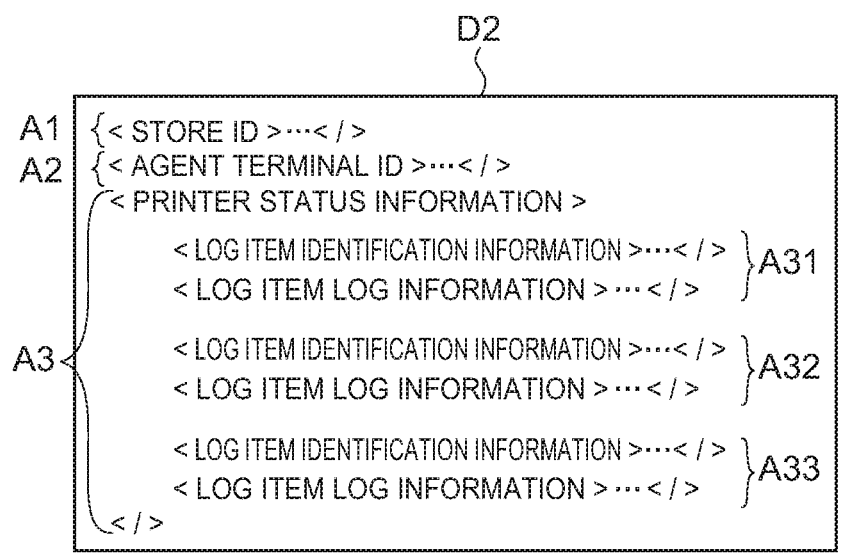
FIG. 20 shows another example of status data D2.

FIG. 20 illustrates the structure of the content of the status data D2.

The status data D2 contains store ID identifying the store where the printer 92 that generated the status data D2 is deployed. The store ID is identification information uniquely assigned to each store. Store identification information indicating the store where the printer 92 is deployed is previously registered in each printer 92. In the status data D2 shown for example in FIG. 20, the store ID is written to line A1.

The status data D2 also contains printer ID indicating the printer 92 that generated the status data D2. The printer ID is written to line A2 in the sample status data D2 shown in FIG. 20.

Printer Status information is written in the status data D2. The printer status information is written to line A3 in the sample status data D2 shown in FIG. 20.

The printer status information includes sets of log item ID and log item log information for each log item. In the status data D2 shown for example in FIG. 20, the log item ID (printer error ID) and log item log information (printer error log information) of each printer error log item are written to line A31.

The log item ID (printhead line count ID) and log item log information (total printed line count log information) are written for the total printed line count log item on line A32.

The log item ID (total cutter operation count ID) and log item log information (total cutter operation count log information) are written to line 33 for the total cutter operation count log item.

The status data D2 thus contains store ID, printer ID, and sets of log item ID and log item log information for each log item.

As shown in column (A) of FIG. 19, after generating the status data D2 in step SL2, the status data generator 601 controls the printer communication unit 43 to send the generated status data D2 to the maintenance server 7 (step SL3). The process of step SL3 is an example of a process of sending a response request from a printer 92 to a server.

In step SL3, the status data generator 601 sends an HTTP request with the status data D2 in the request body to the maintenance server 7 by HTTP. Note that the URL of the maintenance server 7 to which the status data D2 is sent, the protocol to use, and other information required to send the status data D2 as a response request to the maintenance server 7 is previously set.

After sending the status data D2, the status data generator 601 returns to step SL1.

As shown in column (C) of FIG. 19, the status data receiver 201 of the maintenance server 7 controls the maintenance server communication unit 22 to receive the status data D2 (step SN1).

Next, the status data receiver 201 outputs the received status data D2 to the response unit 202 (step SN2) and to the analyzer 203 (step SN3).

As shown in column (D) of FIG. 19, the response unit 202 acquires the status data D2 output by the status data receiver 201 (step SO1).

Next, the response unit 202 references the communication interval file 212 (step SO2). The communication interval file 212 is a file recording communication interval information indicating the communication interval, which is the interval at which the printer 92 sends the status data D2, written by the communication interval calculator 204 using a method described below.

Next, the response unit 202 generates the communication interval information data D3 indicating the communication interval information based on the communication interval information recorded in the communication interval file 212 (step SO3).

Next, the response unit 202 controls the maintenance server communication unit 22 to send the generated communication interval information data D3 as a response to the printer 92 (step SO4). In this example the response unit 202 sends an HTTP response having the communication interval information data D3 written in the response body to the printer 92 by HTTP.

The process of step SO3 is an example of a process of the server sending a response to a client based on a response request received from the client.

As shown in column (B) of FIG. 19, the interval updater 602 of the printer 92 controls the printer communication unit 43 to receive the communication interval information data D3 (step SM1).

Next, the interval updater 602, based on the communication interval information contained in the communication interval information data D3, updates the transmission interval registry 611 so that the interval recorded in the file is the interval (communication interval) indicated by the communication interval information contained in the communication interval information data D3 (step SM2).

As a result of step SM2, the status data generator 601 thereafter generates and sends the status data D2 at the interval defined in the updated transmission interval registry 611.

As shown in column (E) of FIG. 19, the analyzer 203 acquires the status data D2 output by the status data receiver 201 (step SP1).

Next, the analyzer 203 updates the status data database 211 (FIG. 8) based on the acquired status data D2 (step SP2).

In step SP2, the analyzer 203 acquires the printer status information contained in the status data D2. As described above, the printer status information contains sets of printer ID and the log item ID and log item log information for each log item.

Next, the analyzer 203 identifies the matching record (the record with printer ID of the same value as the printer ID of the printer status information in the status data D2) in the status data database 211 by comparing the printer ID. Next, the analyzer 203 updates the printer error detection information, printhead error detection information, and cutter error detection information in the record that was found based on the acquired printer status information.

More specifically, based on the printer error log information (log item log information) contained in the printer status information, the analyzer 203 determines if a printer error occurred; if an error occurred, changes the value of the printer error detection information to the value indicating a printer error occurred (was detected); and if an error has not occurred, changes the value of the printer error detection information to the value indicating a printer error has not occurred.

Based on the total printed line count log information (log item log information) contained in the printer status information, the analyzer 203 determines if the total printed line count exceeds a specific threshold; changes the value of the printhead error detection information to the value indicating a printhead error occurred (was detected) if the specific threshold was exceeded; and if the specific threshold was not exceeded, changes the value of the printhead error detection information to the value indicating a printhead error has not occurred.

Based on the total cutter operation count log information (log item log information) contained in the printer status information, the analyzer 203 determines if the total cutter operation count exceeds a specific threshold; changes the value of the cutter error detection information to the value indicating a cutter error occurred (was detected) if the specific threshold was exceeded; and if the specific threshold was not exceeded, changes the value of the cutter error detection information to the value indicating a cutter error has not occurred.

The process of the communication interval calculator 204 updating the communication interval file 212 is described next.

As described above, multiple printers 92 are connected to the maintenance server 7, and the number of printers 92 connected to the maintenance server 7 may increase to the maximum number allowed by the scale of the network system 1 (more than 1000, for example). If response requests (status data D2) are transmitted from printers 92 at a high concentration within a short period of time, the processing load on the maintenance server 7 increases, and processing by the maintenance server 7 may be delayed.

As a result, the communication interval calculator 204 calculates a communication interval of an appropriate value to reduce the chance of a high concentration of response requests being sent from multiple printers 92 in a short period of time, and thereby suppress increasing the processing load on the maintenance server 7.

The process whereby the communication interval calculator 204 updates the communication interval file 212 is the same as the process described with reference to FIG. 9 in the first embodiment except that agent terminals 11 are connected to the maintenance server 7 in the first embodiment, and printers 92 are connected instead of the agent terminals 11 in the second embodiment.

In this process, the printer ID input screen G101 and information screen G111 presented on the display panel of the home office terminal display unit 33 of the head office terminal 5, the actions taken by the maintenance technician and the operation of the maintenance server 7 in response thereto, are equivalent to the operations described in the first embodiment with reference to FIG. 10 and FIG. 11.

Note that the communication interval may be calculated to reflect various sorts of margins. For example, the number of connected terminals is the number of printers 92 connected to the maintenance server 7, but may be a number reflecting devices other than printers 92 connected to the maintenance server 7.

Information indicating if a printer error occurred, information indicating if a printhead error occurred, information indicating if a cutter error occurred, and information indicating if a CPU error occurred (not shown in the figure) are displayed in field A112 of the information screen G111 (FIG. 11).

The operation of a printer 92 installed in the store when the printer 92 is turned on is described next.

Figure 21:
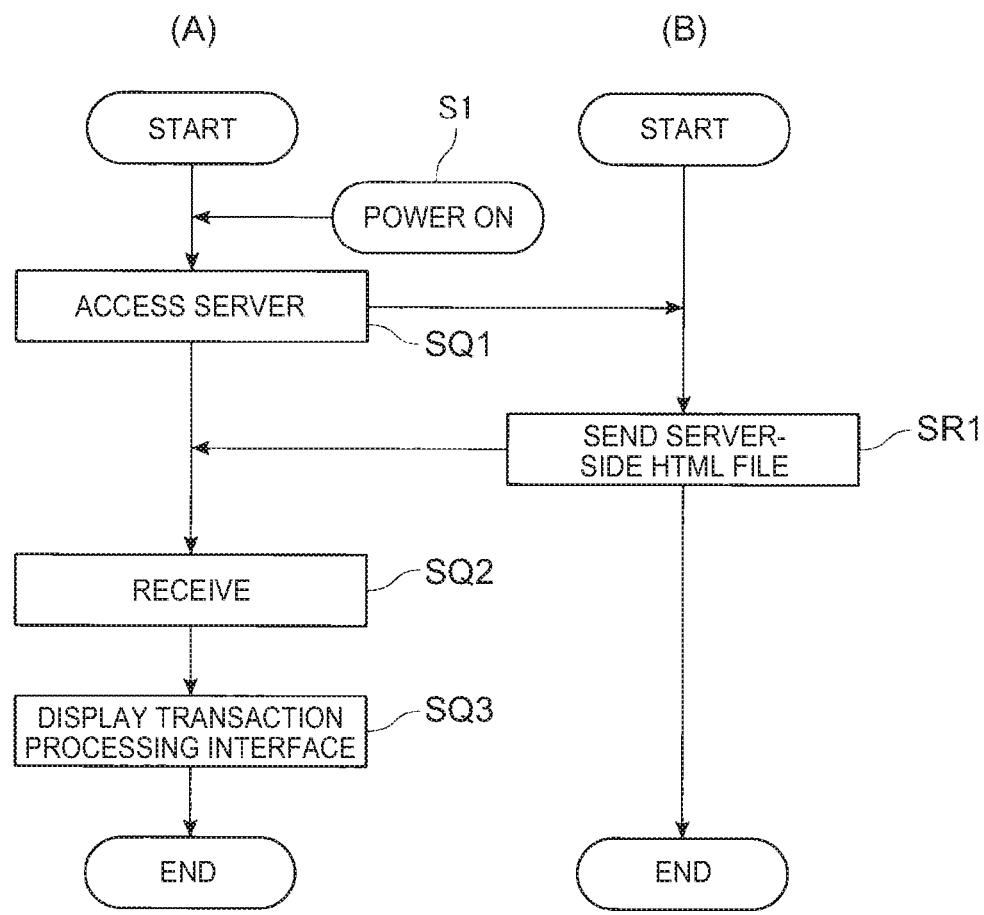
FIG. 21 is a flow chart of the operation of a printer and POS server.

FIG. 21 is a flow chart showing the operation of the POS server 102 and printer 92 when the printer 92 is turned on. Column (A) of FIG. 21 shows the operation of the printer 92, and column (B) of FIG. 21 shows the operation of the POS server 102.

The checkout clerk first turns the printer 92 on (step S1). In this example, the printer 92 is installed at a checkout counter, and the checkout clerk turns the printer 92 on when the store opens each day. In this second embodiment, the printer 92 is configured to automatically start a specific web browser when the printer 92 turns on.

As shown in column (A) of FIG. 21, the print controller 403 of the printer 92 accesses a specific URL on the POS server 102 (step SQ1). The URL of the POS server 102, the format of data exchanged in communication with the POS server 102, and other information required to communicate with the POS server 102 is previously registered in the printer 92.

As shown in column (B) of FIG. 21, when the specific URL is accessed by the printer 92, the transaction process execution unit 501 of the POS server 102 controls the POS server communication unit 52 to send a specific HTML file to the printer 92 (step SQ1). The specific HTML file is an HTML file having at least a function for displaying the user interface for processing transactions 80 described below.

As shown in column (A) of FIG. 21, the print controller 403 of the printer 92 controls the printer communication unit 43 to receive and acquire the specific HTML file (step SQ2).

Next, the print controller 403 executes the acquired specific HTML file, and displays a user interface for processing transactions (FIG. 22) on the touch panel TP (step SQ3).

Figure 22:
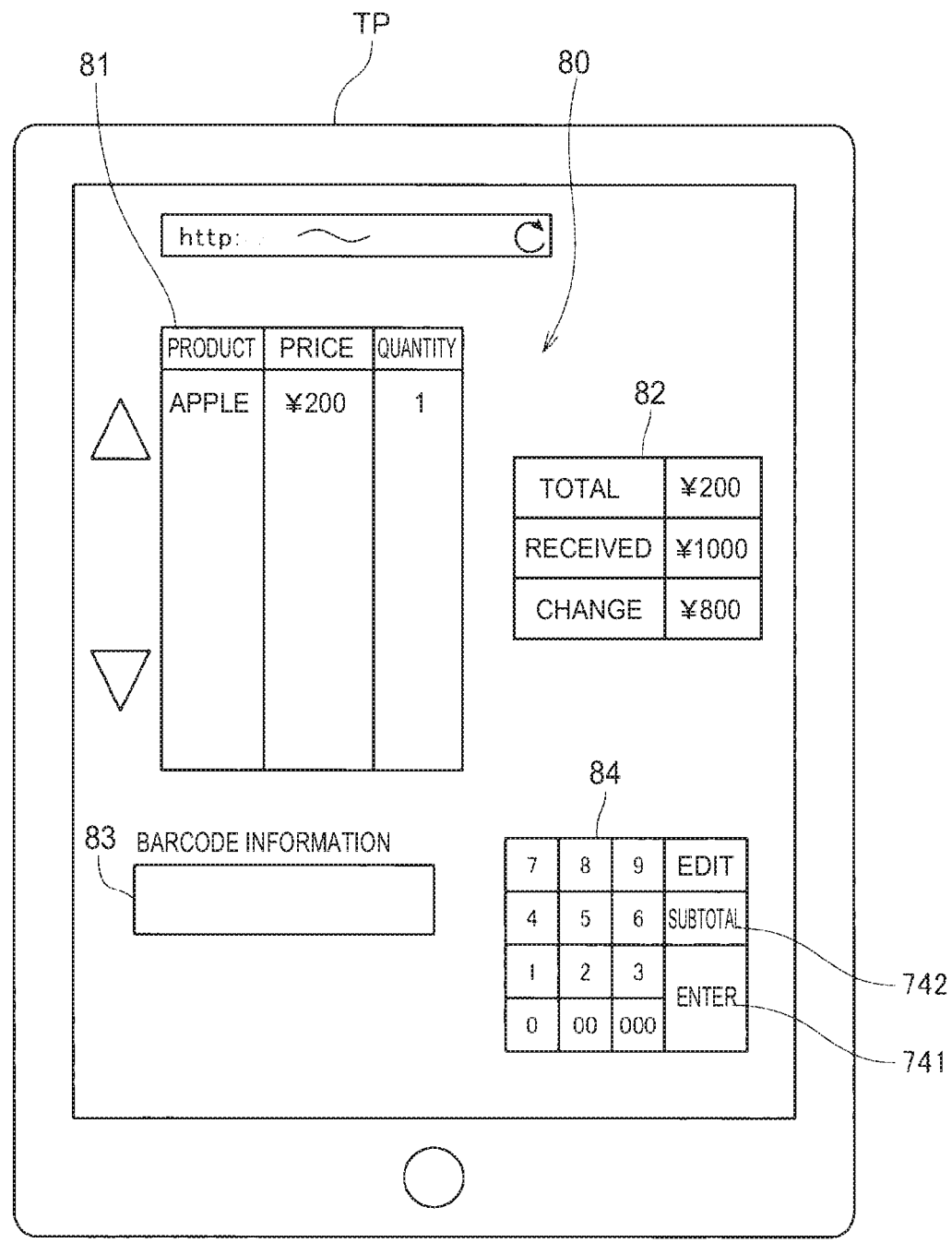
FIG. 22 shows an example of a user interface for transaction processing.

FIG. 22 shows an example of a user interface for processing transactions 80 that is displayed on the touch panel TP.

A list display area 81 where the names of the products being purchased by the customer, the prices of the products, and the quantities of the products are presented in a list is displayed at the top left of the user interface for processing transactions 80 in FIG. 22. To the right of this list display area 81 is presented an amount display area 82 where the total amount of the products being purchased by the customer, the amount of money received from the customer in the transaction, and the amount of change due to the customer are displayed.

Below the list display area 81 is a barcode information display area 83 where information (referred to below as barcode information) expressed by the barcode that is read by the barcode scanner BS is displayed. The barcode information is basically the product code assigned to the product.

A virtual keypad 84 is displayed on the right side of the barcode information display area 83. The virtual keypad 84 includes an Enter key 741 for finalizing the transaction, and a Subtotal key 742 for calculating the subtotal (the total of the products purchased by the customer).

The checkout clerk then processes the transaction using the user interface for processing transactions 80 at the checkout counter.

As described above, a user interface for processing transactions 80 used to process a transaction (business) at the checkout counterL is automatically displayed on the touch panel TP of the printer 92 when the printer 92 turns on. As a result, there is no need for the operator to input the URL of the POS server 102, for example, when the printer 92 turns on, and the productivity of the operator and user convenience are excellent.

The transaction process executed by the printer 92 during a transaction at the checkout counter is described next.

Figure 23:
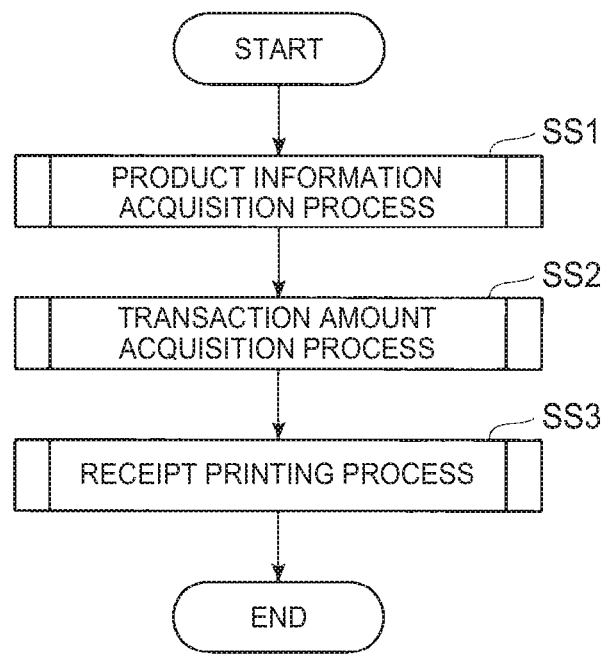
FIG. 23 is a flow chart of the operation of the printer.

FIG. 23 is a flow chart of the operation of the printer 92 when executing the transaction process.

As shown in FIG. 23, during the transaction process, the print controller 403 of the printer 92 first executes a product information acquisition process (step SS1).

In the product information acquisition process, the print controller 403 communicates with the POS server 102 to acquire the name and price of each item the customer purchases (referred to below as product-related information), and executes processes based on the acquired product-related information. This product information acquisition process is described further below.

Figure 24:
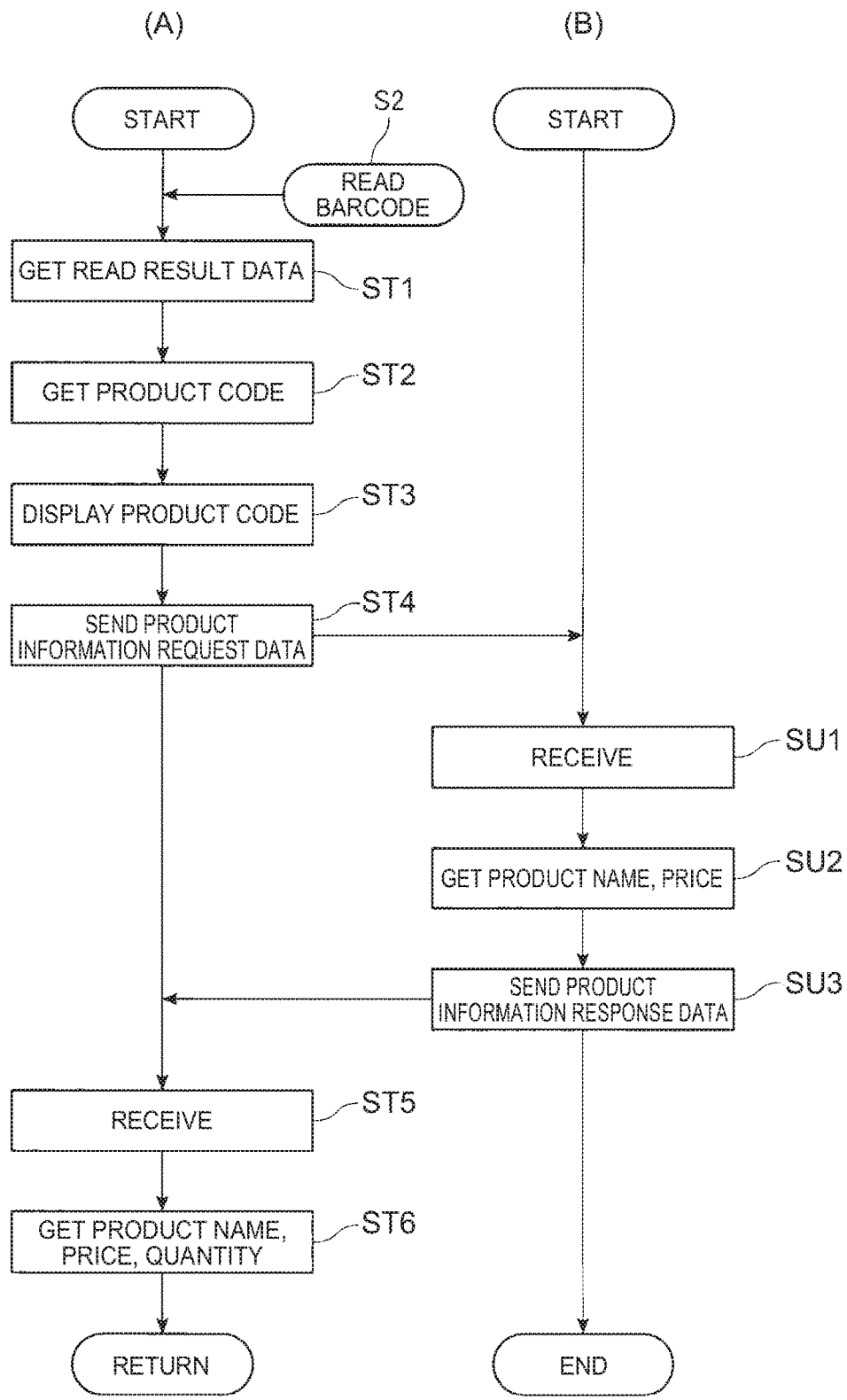
FIG. 24 is a flow chart of the operation of a printer and POS server.

FIG. 24 is a flow chart of the operation of the printer 92 and the POS server 102 when executing the product information acquisition process. Column (A) of FIG. 24 shows the operation of the printer 92, and column (B) of FIG. 24 shows the operation of the POS server 102.

In the transaction process at the checkout counter, the checkout clerk reads the barcode on the product or the packaging of the product being purchased by the customer with the barcode scanner BS (step S2). Upon reading a barcode, the barcode scanner BS sends data based on the read result (referred to below as the "read result data") through the port to which the barcode scanner BS is connected to the printer-device communication unit 44 of the printer 92. The printer-device communication unit 44 then outputs the read result data to the printer controller 40.

The read result data is data including information indicating the product code of the product.

As shown in column (A) of FIG. 24, the print controller 403 of the printer controller 40 of the printer 92 then acquires the read result data based on the input from the printer-device communication unit 44 (step ST1).

Next, the print controller 403 acquires the product code based on the read result data (step ST2).

Next, the print controller 403 displays the product code acquired in step ST2 in the barcode information display area 83 of the user interface for processing transactions 80 (step ST3).

Next, the print controller 403 controls the printer communication unit 43 to send the product name for the product code acquired in step ST2 and data querying the price of the product (referred to below as product information request data) to the POS server 102 (step ST4).

As shown in column (B) of FIG. 24, the transaction process execution unit 501 of the POS server 102 controls the POS server communication unit 52 to receive the product information request data (step SU1).

Next, the transaction process execution unit 501, based on the received product information request data, acquires the product code, references the product master 511 stored by the POS server storage unit 51, and acquires the name and price of the produce identified by the acquired product code (step SU2).

Next, the transaction process execution unit 501 controls the POS server communication unit 52 to send product information response data indicating the product name and price information acquired in step SU2 to the printer 92 (step SU3).

As shown in column (A) of FIG. 24, the print controller 403 of the printer 92 then controls the printer communication unit 43 to receive the product information response data (step ST5).

Next, the print controller 403 acquires the product name and product price information based on the received product information response data, and displays the name, price, and quantity of the product in the corresponding fields of the list display area 81 in the user interface for processing transactions 80 (step ST6).

In the product information acquisition process of step SS1 in FIG. 23, the checkout clerk reads the barcode with the barcode scanner BS from each product being purchased by the customer, and the printer 92 and POS server 102 execute the process shown in the flow chart in FIG. 24 based on the read barcode.

When reading the barcode from every product and processing by each device based on the read barcode is completed, the product information acquisition process shown in step SS1 in FIG. 23 ends.

When the barcode of every product has been read and processing by each device based on the read barcode is completed, the name, price, and quantity of each product the customer purchases is displayed in the list display area 81.

As shown in FIG. 23, after completing the product information acquisition process in step SS1, the print controller 403 executes a transaction amount acquisition process (step SS2). In the transaction amount acquisition process of step SS2, the print controller 403 acquires the total amount of the products purchased by the customer, and acquires the amount of change due based on the amount received from the customer. This transaction amount acquisition process is described further below.

Figure 25:
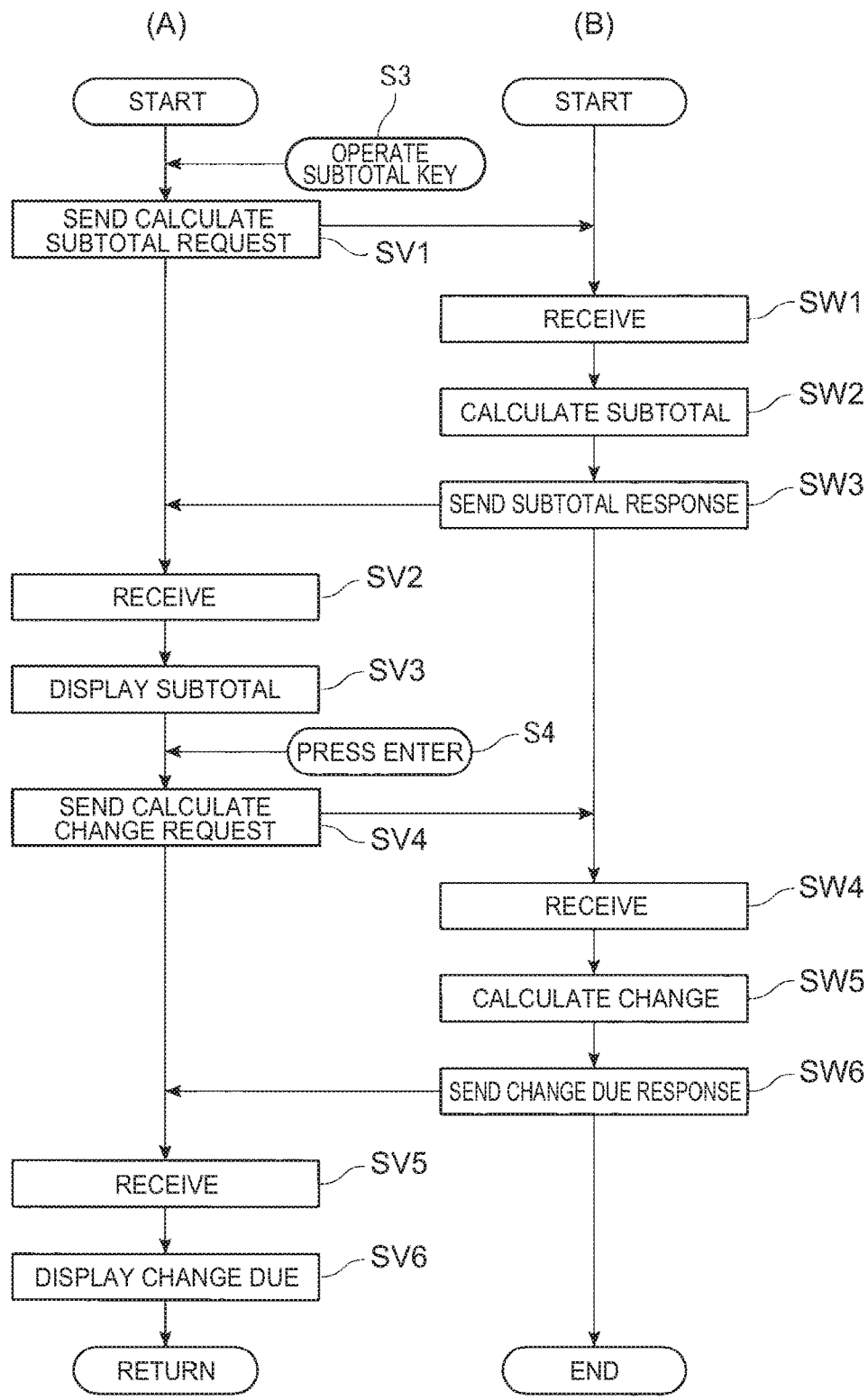
FIG. 25 is a flow chart of the operation of a printer and POS server.

FIG. 25 is a flow chart showing the operation of the printer 92 and the related operation of the POS server 102 in the transaction amount acquisition process. Column (A) of FIG. 25 shows the operation of the printer 92, and column (B) of FIG. 25 shows the operation of the POS server 102.

When reading the barcode from every product is completed, the checkout clerk operates the Subtotal key 742 of the virtual keypad (step S3).

As shown in column (A) of FIG. 25, when operation of the Subtotal key 742 is detected, the print controller 403 of the printer 92 generates a subtotal calculation request requesting calculating the subtotal, and controls the printer communication unit 43 to send the request to the POS server 102 (step SV1).

As shown in column (B) of FIG. 25, the transaction process execution unit 501 of the POS server 102 controls the POS server communication unit 52 to receive the subtotal calculation request (step SW1).

Next, the transaction process execution unit 501 calculates the subtotal based on the received subtotal calculation request (step SW2). Note that the transaction process execution unit 501 manages the product barcodes of the products purchased by the customer based on the product information response request and associated data received from the printer 92. In step SW2, the transaction process execution unit 501 references the product master 511 based on the managed product barcodes, and calculates the subtotal (the total of the purchased products). The method of calculating the subtotal is not limited to this example, and any appropriate method may be used.

Next, the transaction process execution unit 501 sends a subtotal response denoting the calculated subtotal to the printer 92 (step SW3).

As shown in column (A) of FIG. 25, the print controller 403 of the printer 92 controls the printer communication unit 43 to receive the subtotal response (step SV2).

Next, the print controller 403, based on the received subtotal response, displays the subtotal (the total of the purchased products) in the appropriate field of the amount display area 82 (step SV3).

When the subtotal is displayed in the amount display area 62, the customer pays the checkout clerk. The checkout clerk receives payment from the customer, inputs the amount received through the virtual keypad 84, and operates the Enter key 741 (step S4). When operation of the Enter key 741 is detected, the print controller 403 displays the amount received from the customer in the corresponding field of the amount display area 82.

When operation of the Enter key 741 is detected, the print controller 403 also sends a calculate change request requesting calculating the amount of change due to the POS server 102 (step SV4).

As shown in column (B) of FIG. 25, the transaction process execution unit 501 of the POS server 102 controls the POS server communication unit 52 to receive the calculate change request (step SW4).

Next, the transaction process execution unit 501 calculates the amount of change due (step SW5).

Next, the transaction process execution unit 501 sends a change-due response indicating the calculated change that is due to the printer 92 (step SW6).

As shown in column (A) of FIG. 25, the print controller 403 of the printer 92 controls the printer communication unit 43 to receive the change-due response (step SV5).

Next, the print controller 403, based on the received change-due response, displays the amount of change in the appropriate field of the amount display area 82 (step SV6).

Based on the change amount displayed in the amount display area 82, the checkout clerk returns change to the customer.

As described above, in the transaction amount acquisition process of step SS2, the print controller 403 acquires the total of the purchased products, and then gets the amount of change due to the customer based on the amount received from the customer.

As shown in FIG. 23, after the transaction amount acquisition process, the print controller 403 executes a process of producing a receipt (step SS3). In the receipt printing process of step SS3, the print controller 403 communicates with the POS server 102 to produce a receipt printed with information including information related to the products purchased by the customer, and the total of the purchased products. The receipt printing process is described below.

Figure 26:
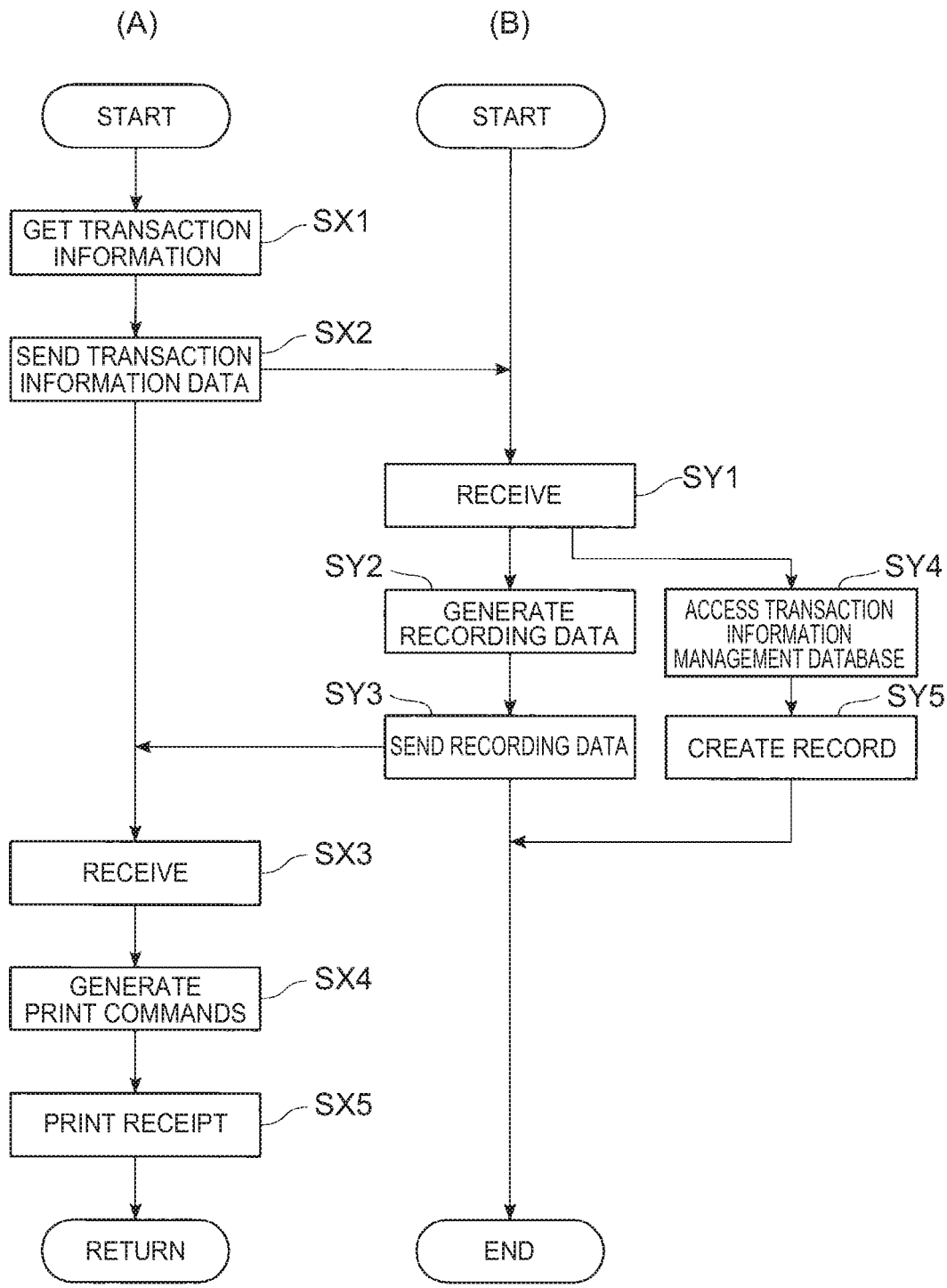
FIG. 26 is a flow chart of the operation of a printer and POS server.

FIG. 26 is a flow chart showing the operation of the printer 92 and the POS server 102 when executing the receipt printing process. Column (A) of FIG. 26 shows the operation of the printer 92, and column (B) of FIG. 26 shows the operation of the POS server 102.

As shown in column (A) of FIG. 26, when the transaction amount acquisition process ends, the print controller 403 of the printer 92 acquires the transaction information (step SX1).

The transaction information is information including: identification information uniquely assigned to each transaction (referred to below as the transaction ID); information denoting the combination of product code, name, price, and quantity for each product purchased by the customer (referred to below as the purchased product information); information denoting the subtotal, the cash amount received from the customer, and the change returned to the customer (referred to below as transaction amount information); information denoting the time of the transaction (referred to below as the transaction time information); and store ID for the store (business) where the transaction was completed.

Note that during a transaction the print controller 403 stores information contained the purchased product information and information contained in the transaction amount information to specific storage areas. In step SX1, the print controller 403 acquires purchased product information and transaction amount information based on the information stored to the specific storage areas.

The time that the transaction was performed as indicated by the transaction time information is the time when the Enter key 741 was operated. The time that the transaction was performed as indicated by the transaction time information is not limited to the time that the Enter key 741 was operated, and may be any time derived from the transaction, such as the time when the barcode for the first product was read in the transaction.

The print controller 403 also has a function for generating transaction ID for each transaction, and generates the transaction ID using this function. The value of the transaction ID is unique to each transaction performed in each store.

After acquiring the transaction information, the print controller 403 controls the printer communication unit 43 to send transaction information data expressing the acquired transaction information data to the POS server 102 (step SX2).

As shown in column (B) of FIG. 26, the transaction process execution unit 501 of the POS server 102 controls the POS server communication unit 52 to receive the transaction information data (step SY1).

Next, the transaction process execution unit 501 generates recording data for producing a receipt in a specific layout based on the transaction information indicated by the received transaction information data (step SY2).

The recording data is control data specifying producing a receipt according to a specific layout, and including in this example a top logo, bottom logo, transaction ID, the time of the transaction, the name, price, quantity and total amount of the products purchased by the customer, the amount received from the customer, and the amount of change due to the customer. The recording data in this embodiment is an XML document of information written in a specific XML format.

Next, the transaction process execution unit 501 controls the POS server communication unit 52 to send the generated recording data to the printer 92 (step SY3).

After receiving the transaction information data in step SY1, the transaction process execution unit 501 accesses the transaction information management database 512 stored by the POS server storage unit 51 (step SY4).

Each record in the transaction information management database 512 relationally stores the transaction ID, purchased product information, transaction amount information, transaction time information, and store ID.

Next, based on the transaction information data received in step SY2, a record relating the transaction ID, purchased product information, transaction amount information, transaction time information, and store ID is created in the transaction information management database 512 (step SY5).

The POS server 102 thus cumulatively stores transaction information appropriate to each transaction. As a result, information such as sales by store and sales by individual product in each store can be managed.

As shown in column (A) of FIG. 26, the print controller 403 of the printer 92 controls the printer communication unit 43 to receive the recording data (step SX3).

Next, the print controller 403 generates recording commands in the command language of the printing device print unit 41 based on data recorded in an XML document (step SX4).

Next, the print controller 403 controls the printing device print unit 41 based on the generated recording commands to produce a receipt (step SX5).

The checkout clerk then gives the receipt produced in step SX5 to the customer.

As described above, the printer 92 in the second embodiment of the invention executes a transaction process and produces a receipt appropriate to the transaction using functions of the POS server 102. The POS server 102 also cumulatively stores transaction information derived from transaction processes.

As described above, the network system 1 according to the second embodiment of the invention is a system having printers 92 (clients) that transmit response requests (status data D2) at a specific interval, and a maintenance server 7

(server) that sends a response to the printer 92 based on the response request received from the printer 92, connected over a network.

The maintenance server 7 calculates a communication interval indicating the interval at which the printers 92 transmit response requests based on factors that affect the processing load of the server, and sends communication interval information indicating the calculated communication interval to the printers 92.

The printers 92 transmit response requests at the interval corresponding to the interval indicated by the communication interval information received from the maintenance server 7 (server).

The maintenance server 7 may also be configured to manage for each printer 92 the amount of data (for example, the average amount of data in the status data D2 transmitted by a printer 92 during a specific past period of time) in the status data D2 transmitted by the printer 92, and by comparing the amount of data that is managed with a specific threshold, determine whether or not to reflect a specific margin in the timing for the printer 92 to send the first status data D2 after sending the initial response request data.

The printer 92 also sends initial response request data (response request) after waiting for a randomly set time after booting up or when communication with the maintenance server 7 is restored. When sending the status data D2 for the first time after sending the initial response request data, the printer 92 may transmit at the timing specified by the maintenance server 7.

Because the printer 92 transmits response requests to the maintenance server 7 at the interval indicated by a communication interval calculated based on factors affecting the processing load on the maintenance server 7, a high concentration of response requests (status data D2) being sent in a short time from the printer 92 to the maintenance server 7 can be prevented. As a result, the processing load of the maintenance server 7 increasing due to a high concentration of response requests being sent in a short time, and a delay in processing by the maintenance server 7, can be suppressed.

A printer 92 in the second embodiment sends status data D2 containing processing device status information related to the printing device print unit 41 (print unit) as a response request to the maintenance server 7 at the interval corresponding to the interval indicated by the communication interval information.

This configuration enables the printer 92 to report the status of the printer 92, including the state of the printing device print unit 41, to the maintenance server 7 at a regular interval while suppressing the processing load of the maintenance server 7 from increasing due to status data D2 being transmitted at a high concentration in a short time.

The communication interval calculator 204 of the maintenance server 7 in the second embodiment calculates the communication interval to reflect, as a factor affecting the processing load of the maintenance server 7, the number of printers 92 connected to the maintenance server 7.

This configuration enables calculating a communication interval of an appropriate value considering a characteristic of the network system 1, that is, the number of printers 92 connected to the maintenance server 7.

The communication interval calculator 204 of the maintenance server 7 in the second embodiment also calculates the communication interval to reflect the processing capacity of the maintenance server 7, the size of the status data D2, and the time required to process the status data D2.

This configuration enables calculating a communication interval of an appropriate value reflecting specific factors affecting the processing load of the maintenance server 7.

Note that the communication interval is calculated in the second embodiment to reflect the processing capacity of the maintenance server 7, the size of the status data D2, and the time required to process the status data D2, but a communication interval of an appropriate value reflecting factors affecting the processing load of the maintenance server 7 can be calculated if the communication interval is calculated to reflect any one of these factors.

The maintenance server 7 in the second embodiment has a communication interval calculator 204 that calculates a communication interval indicating the interval at which an printer 92 transmits response requests based on factors affecting the processing load of the server. The printer 92 also has an interval updater 602 that changes the interval for transmitting response requests based on the interval indicated by the communication interval information.

This configuration uses functions of the communication interval calculator 204 of the maintenance server 7 and the interval updater 602 of the printer 92 to suppress increasing the processing load of the maintenance server 7 and delayed processing by the maintenance server 7 due to a high concentration of response requests in a short time.

The invention is described above with reference to a preferred embodiment thereof, but the invention is not limited thereto and can be modified and adapted in many ways without departing from the scope of the accompanying claims.

For example, when the communication control method of the network system 1 described above is implemented using a host computer of devices in the network system 1 or external devices connected to the devices, the invention can be configured by a program run by a computer to implement the communication control method, a computer-readable recording medium storing the program, or a communication medium communicating the program. Exemplary storage media include magnetic and optical recording media, and semiconductor memory devices. More specifically, removable storage media such as floppy disks, hard disk drives, CD-ROM (Compact Disk Read Only Memory), DVD (Digital Versatile Disk), Blu-ray® Discs, magneto-optical discs, flash memory, and memory card media, or fixed recording media, may also be used. The recording media may also be RAM (random access memory), ROM (read-only memory), or a hard disk drive or other nonvolatile memory used as internal storage of a device in the network system 1 or an external device connected to a device in the network system 1.

The invention is described above using the store system 3 deployed in a store, but the facility in which the store system 3 is deployed is not limited to stores.

Communication between devices in the network system 1 may also be by any desirable means.

The printer 9 in the foregoing embodiment is described using thermal recording method, but the recording method is not so limited.

Function blocks in the foregoing embodiments may also be embodied as desired by the cooperation of hardware and software, and do not suggest a specific hardware configuration.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

What is claimed is:

1. A network system comprising:
a first client comprising a processor, coupled to a network and configured to transmit requests for response over the network at specific time intervals; and
a server comprising a processor, coupled to the network, the server being configured to:
receive a request from the first client;
send a response to the first client in response to the received request;
calculate a communication interval indicating a time interval at which the first client is to transmit requests, the communication interval being calculated based on a factor affecting a processing load of the server, the factor including an amount of data received in the request received from the first client; and
send communication interval information indicating the calculated communication interval to the first client, wherein:
the first client is further configured to use the calculated communication interval indicated by the received communication interval information as a specific time interval, and transmit requests at the calculated communication interval indicated by the received communication interval information,
the first client is further configured to transmit an initial request after delaying transmission for a randomly set time period following booting up or following a period when communication with the server was prohibited,
a plurality of clients are connected to the server via the network,
when the server receives a request transmitted from one client of said plurality of clients following the booting up of the one client or resumption of communication of the one client following a period when communication has been prohibited,
the server is further configured to send to the one client a response including information specifying a time offset for the one client to be added to a specific time interval of the one client when it next transmits a request so that a time offset is created between the time when the one client sends requests at a specific time interval and the time when another of said plurality of clients having the same specific time interval sends requests,
after transmitting a request with the time offset specified by the server, the one client transmits a next request without the time offset at the specific time interval,
the plurality of clients have respective, connected periphery devices,
the plurality of clients each transmit status data as a request, the status data including information related to operating states of their connected periphery devices,
the server is further configured to send the response including information specifying the time offset to particular clients that have more than a specific threshold number of connected periphery devices, and
the time offset being added to a corresponding specific time interval of one of the particular clients when the one particular client next boots up or resumes communication after period when communication was prohibited.

2. The network system described in claim 1, further comprising a periphery device connected to the first client; wherein the first client is further configured to:
receive status information from the periphery device, the status information being related to an operating state of the periphery device; and
transmit status data including the status information received from the periphery device to the server as a request at the indicated calculated communication interval.

3. The network system described in claim 1, wherein the factor affecting the processing load of the server further includes the number of clients connected to the server.

4. The network system described in claim 1, wherein the factor affecting the processing load of the server further includes at least one of the processing capacity of the server, or the time required to process the data received as a request from the first client.

5. The network system described in claim 1, wherein:
the server includes a communication interval calculator that calculates the communication interval indicating the time interval at which the first client is to transmit requests; and
the first client includes an interval updater that updates the specific time interval based on the calculated communication interval indicated by the communication interval information.

6. The network system described in claim 1, wherein
the server is further configured to send the information specifying the time offset to the one client that transmits a request of a size exceeding a specific threshold, the time offset being added to the one client's specific time interval when the one client next boots up or resumes communication after a period when communication has been prohibited.

7. The network system described in claim 1, wherein the first client is a printing device having a print mechanism that prints on a recording medium, and transmits the requests at the specific time intervals.

8. The network system described in claim 7, wherein the printing device transmits status data including information related to the print mechanism as the request at the calculated communication interval indicated by the received communication interval information.

9. A client configured to connect through a network to a server, comprising:
a processor configured to:
delay transmitting a request by a randomly set time following booting up or following resumption of communication after a period when communication was prohibited,
transmit the request to the server,
receive, from the server, communication interval information indicating a time interval at which the client is to transmit requests, the time interval having been calculated based on a factor affecting a processing load of the server, the factor including an amount of data transmitted in the request from the client,
transmit requests at the calculated communication interval indicated by the received communication interval information, and
transmit an initial request after delaying transmission for a randomly set time period following booting up or following a period when communication with the server was prohibited, wherein:
the client further comprises a plurality of clients connected to the server via the network,
the plurality of clients have respective, connected periphery devices, when the server receives a request transmitted from one client of said plurality of clients following the booting up of the one client or resumption of communication of the one client following a period when communication has been prohibited, the one client is configured to:
receive from the server a response including information specifying a time offset for the one client to be added to a specific time interval of the one client when it next transmits a request so that a time offset is created between the time when the one client sends requests at a specific time interval and the time when another of said plurality of clients having the same specific time interval sends requests, and
after transmitting a request with the time offset specified by the server, transmit a next request without the time offset at the specific time interval,
each of the plurality of clients is configured to transmit status data as a request, the status data including information related to operating states of their connected periphery devices, and
when the server sends the response including information specifying the time offset to particular clients that have more than a specific threshold number of connected periphery devices, the time offset is added to a corresponding specific time interval of one of the particular clients when the one particular client next boots up or resumes communication after period when communication was prohibited.

10. A communication control method of a network system including a client configured to transmit requests for response over the network at a specific time interval and a server configured to send a response to the client in response to receiving a request from the client, the method comprising;
receiving, by a processor of the server, a request from the client;
sending, by the processor of the server, a response to the client in response to the received request;
calculating, by the processor of the server, a communication interval indicating a time interval at which the client is to transmit requests based on a factor affecting a processing load of the server, the factor including the amount of data received in the request received from the client, and sending communication interval information indicating the calculated communication interval to the client;
transmitting, by a processor of the client, the request at the calculated communication interval indicated by the received communication interval information sent from the server; and
transmitting, by the processor of the client, an initial request after delaying transmission for a randomly set time period following booting up or following a period when communication with the server was prohibited, wherein:
a plurality of clients are connected to the server via the network,
the plurality of clients have respective, connected periphery devices,
the communication control method further comprises:
when the server receives a request transmitted from one client of said plurality of clients following the booting up of the one client or resumption of communication of the one client following a period when communication has been prohibited, sending, by the processor of the server, to the one client a response including information specifying a time offset for the one client to be added to a specific time interval of the one client when it next transmits a request so that a time offset is created between the time when the one client sends requests at a specific time interval and the time when another of said plurality of clients having the same specific time interval sends requests,
after transmitting a request with the time offset specified by the server, transmitting, by the one client, a next request without the time offset at the specific time interval,
transmitting, by each of the plurality of clients, status data as a request, the status data including information related to operating states of their connected periphery devices,
sending, by the processor of the server, the response including information specifying the time offset to particular clients that have more than a specific threshold number of connected periphery devices, and
adding the time offset to a corresponding specific time interval of one of the particular clients when the one particular client next boots up or resumes communication after period when communication was prohibited.

* * * * *